(12) United States Patent  (10) Patent No.: US 9,407,793 B2
Yamada  (45) Date of Patent: Aug. 2, 2016

(54) COLOR CONVERSION USING LOOK-UP TABLE

(71) Applicant: CANON KABUSHIKI KAISHA, Tokyo (JP)

(72) Inventor: Michihiko Yamada, Tsukubamirai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/630,601

(22) Filed: Feb. 24, 2015

(65) Prior Publication Data

US 2015/0256717 A1  Sep. 10, 2015

(30) Foreign Application Priority Data

Mar. 5, 2014  (JP) .................................. 2014-043152
Aug. 6, 2014  (JP) .................................. 2014-160803

(51) Int. Cl.
*H04N 1/60* (2006.01)
*H04N 1/32* (2006.01)
*H04N 1/64* (2006.01)
*H04N 1/393* (2006.01)

(52) U.S. Cl.
CPC ......... *H04N 1/6019* (2013.01); *H04N 1/32309* (2013.01); *H04N 1/3935* (2013.01); *H04N 1/648* (2013.01)

(58) Field of Classification Search
CPC combination set(s) only.
See application file for complete search history.

(56) References Cited

U.S. PATENT DOCUMENTS

| | | | |
|---|---|---|---|
| 8,780,410 B2 | 7/2014 | Kouguchi | |
| 2002/0154138 A1* | 10/2002 | Wada | G09G 3/002 345/600 |
| 2005/0264836 A1* | 12/2005 | Gotoh | H04N 1/6019 358/1.9 |
| 2013/0188868 A1* | 7/2013 | Fujii | G06K 9/36 382/167 |

FOREIGN PATENT DOCUMENTS

JP  2013-103370 A  5/2013

* cited by examiner

*Primary Examiner* — Mohammad Ghayour
*Assistant Examiner* — Christopher D Wait
(74) *Attorney, Agent, or Firm* — Fitzpatrick, Cella, Harper & Scinto

(57) ABSTRACT

For enabling unified color processing to be performed even in the case of performing different color processing on a specific color, an image processing apparatus having a color conversion unit configured to perform color conversion using a LUT for defining conversion from an input color to an output color, comprises: an input unit configured to input an image that is to be a target of color conversion; an accepting unit configured to accept designation of a specific color; and a generation unit configured to register an output value corresponding to the specific color at an unused grid point in the LUT, and generate a specific color-associated LUT, wherein, if the specific color is used in an image input by the input unit, the color conversion unit performs color conversion using the generated specific color-associated LUT.

7 Claims, 21 Drawing Sheets

| CYAN | (0,255,255) | ~701 |
|---|---|---|
| MAGENTA | (255,0,255) | |
| SKYBLUE | (0,0,255) | |
| MAROON | (51,0,255) | |
| ... | ... | |

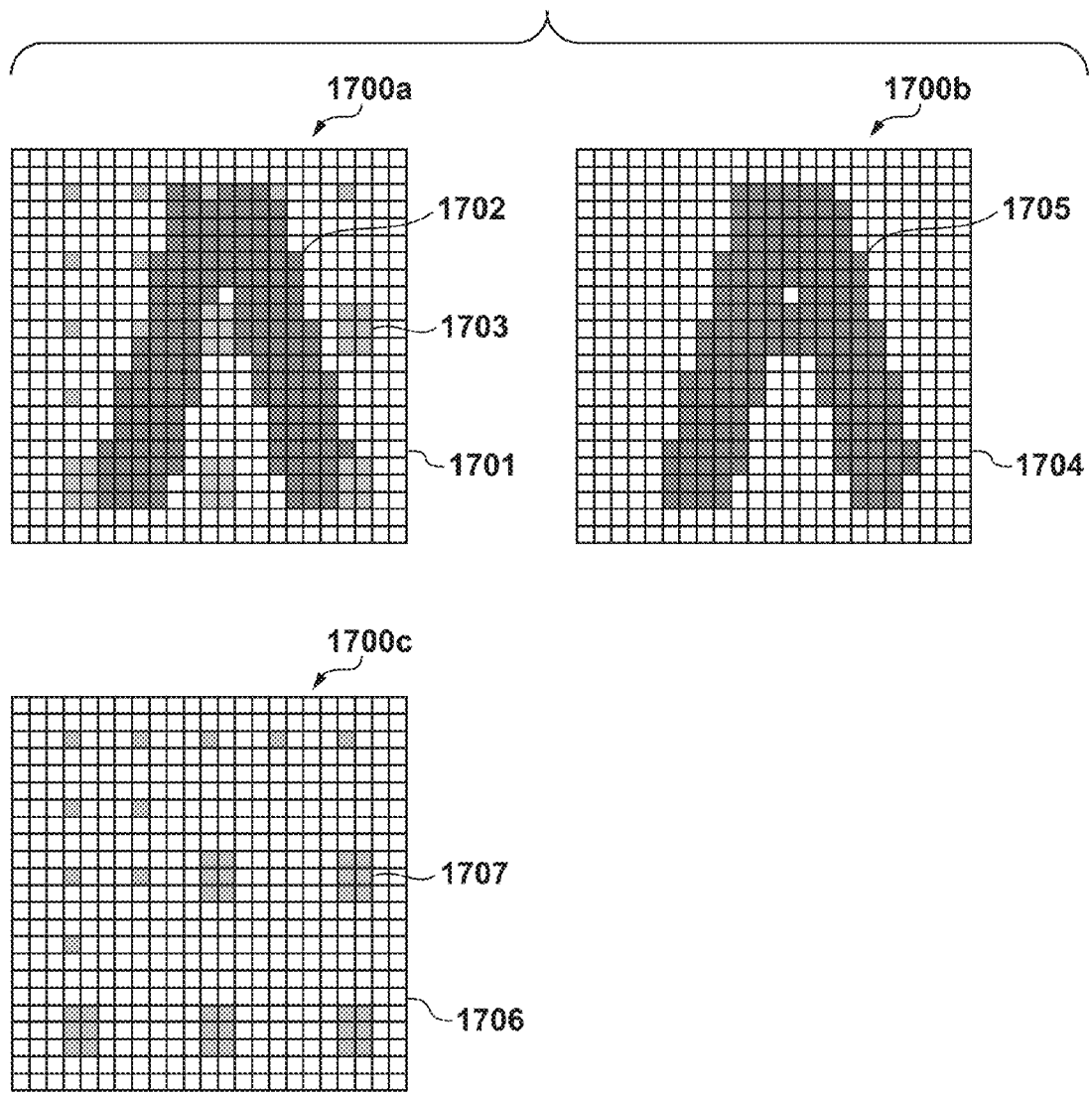

COLOR CONVERSION USING LOOK-UP TABLE

BACKGROUND OF THE INVENTION

1. Field of the Invention

The present invention relates to color conversion processing for image data.

2. Description of the Related Art

A color management system (CMS) is used for managing colors in different devices in a unified manner. However, there are cases where it is not desired to change a color value of a specific color or where it is desired to change the specific color to a desired color in a fixed manner. For this reason, for example, in Japanese Patent Laid-Open No. 2013-103370, color space information indicating a color space of raster data, and specific color information representing positions of pixels having specific color values are generated together with the raster data. A technique is proposed with which the raster data, the color space information, and the specific color information are associated with one another, and the color processing method is switched using the color space information and the specific color information. For example, the specific color is replaced with an output color that is designated in advance, and normal colors, which are colors other than the specific color, are subjected to color processing for the normal colors.

However, with the above conventional technique, the processing needs to be switched between the processing for the specific color and the processing for the normal colors other than the specific color. That is to say, separate processing modules are necessary for the specific color and the normal colors, and a problem such as an increase in processing costs arises.

SUMMARY OF THE INVENTION

According to one aspect of the present invention, an image processing apparatus having a color conversion unit configured to perform color conversion using a look-up table (LUT) for defining conversion from an input color to an output color, the apparatus comprises: an input unit configured to input an image that is to be a target of color conversion; an accepting unit configured to accept designation of a specific color; and a generation unit configured to register an output value corresponding to the specific color at an unused grid point in the LUT, and generate a specific color-associated LUT, wherein, if the specific color is used in an image input by the input unit, the color conversion unit performs color conversion using the specific color-associated LUT generated by the generation unit.

According to another aspect of the present invention, an image processing apparatus having a color conversion unit configured to perform color conversion using a look-up table (LUT) for defining conversion from an input color to an output color, the apparatus comprises: an input unit configured to input an input image and a copy-forgery-inhibited pattern (CFIP) image that is used for a CFIP when forming the input image; a designation unit configured to designate a color that is to be used in the CFIP image as a specific color; and a generation unit configured to register an output value corresponding to the specific color at an unused grid point in the LUT and generate a specific color-associated LUT, wherein, if the CFIP image is used, the color conversion unit performs color conversion using the specific color-associated LUT generated by the generation unit.

The present invention enables unified color processing to be performed even in the case of performing different color processing for a specific color.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 17 is a diagram illustrating showing changes of images in the CFIP separation unit and an image combining unit.

DESCRIPTION OF THE EMBODIMENTS

Hereinafter, preferable embodiments of the invention will be described in detail with reference to the drawings. Note that the following embodiments are mere examples, and are not intended to limit the scope of the present invention.

First Embodiment

As a first embodiment of an image processing apparatus according to the present invention, an example of an image processing system including an image forming apparatus and a personal computer (hereinafter referred to as a PC), which is an information processing apparatus, will be described below.

System Configuration

Figure 1:
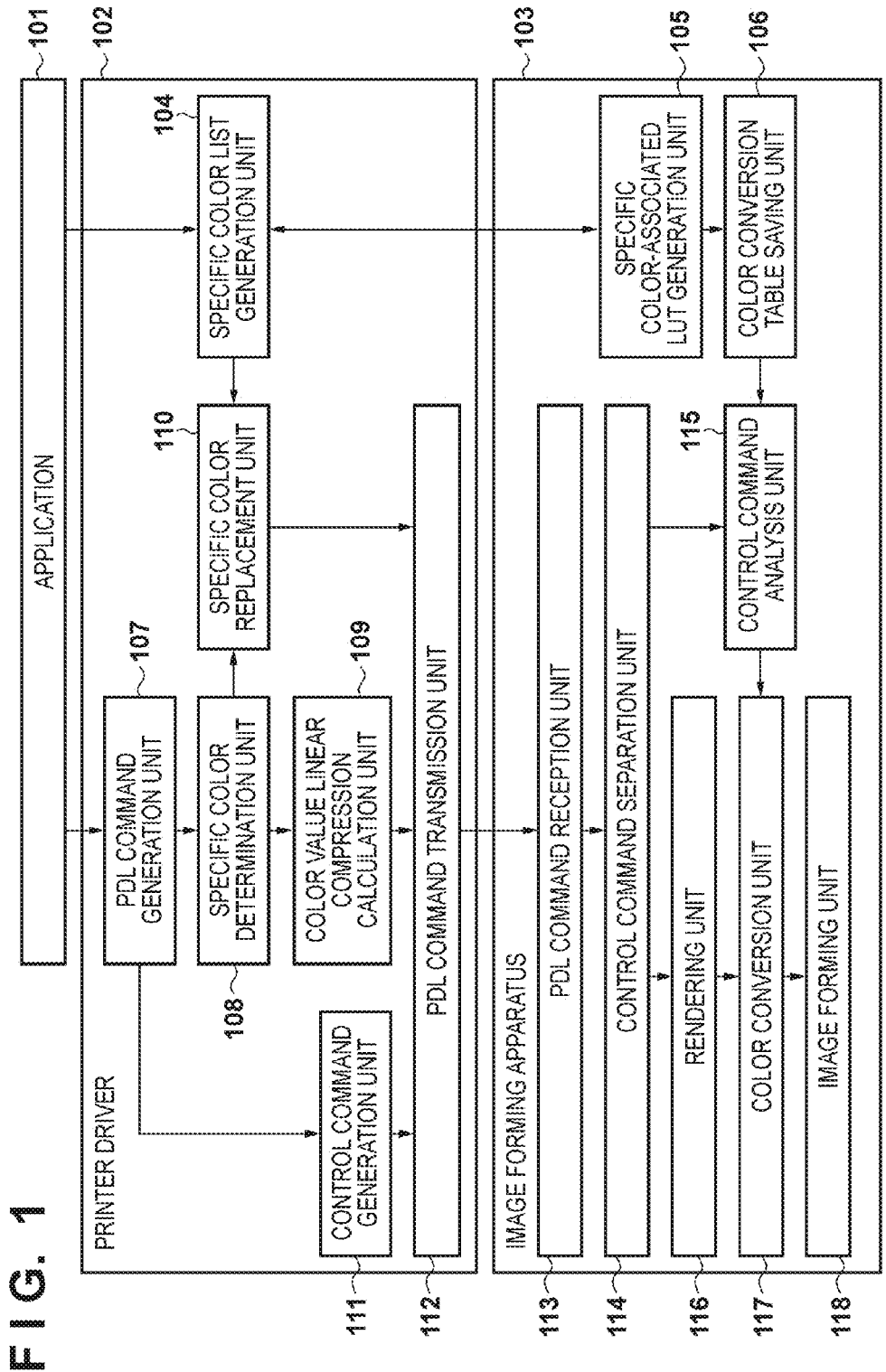
FIG. 1 is a block diagram showing a configuration of an image processing system according to a first embodiment.

FIG. 1 is a block diagram showing a configuration of an image processing system according to the first embodiment. In this diagram, an application 101 is a program that creates a document, creates a diagram, and performs image processing and the like on the PC. The application 101 also has a function of designating colors having specific color values as "specific colors".

A printer driver 102 is a program that converts data generated by the application 101 into command data (hereinafter referred to as a PDL command) described in a printer/page description language which is interpretable for an image forming apparatus 103.

A PDL command generation unit 107 converts a command (processing target image data) received from the application 101 into a PDL command. A specific color determination unit 108 discriminates a specific color contained in the PDL command. A color value linear compression calculation unit 109 linearly compresses color values other than the color value of the specific color contained in the PDL command, in the case where the specific color is designated.

A specific color list generation unit 104 communicates with the image forming apparatus 103, and generates, as a list, a relationship between the specific color and a color value denoting the coordinates of a grid point at which the specific color is stored. The specific color replacement unit 110 references the list generated by the specific color list generation unit 104, and replaces the color value of the specific color contained in the PDL command with a specific color value, in the case where the specific color is designated.

A control command generation unit 111 generates a control command (later-described specific color presence information) indicating whether or not the specific color is designated in the PDL command. A PDL command transmission unit 112 transmits the PDL command to the image forming apparatus 103. Note that, in this description, the control command generated by the control command generation unit 111 is embedded in the PDL command.

Note that the application 101 and the printer driver 102 are executed on the PC, for example. The PC has a CPU that executes processing operations including various kinds of calculation, control, discrimination, and the like, a ROM that stores programs and the like, and a RAM that temporarily stores data on which the CPU is performing a processing operation, input data, and the like, for example. The PC reads out various programs such as the application 101 and the printer driver 102 from the RAM, and executes them using the CPU.

The image forming apparatus 103 is an apparatus that receives the PDL command from the printer driver 102, generates printable data, and forms an image (performs printing) on a recording medium.

A PDL command reception unit 113 receives the PDL command from the printer driver 102. A control command separation unit 114 separates the control command from the received PDL command. A control command analysis unit 115 analyzes whether or not the specific color is designated in the control command separated from the PDL command. If the specific color is designated, the control command analysis unit 115 then sets, in a color conversion unit 117, a look-up table (hereinafter referred to as an LUT) that is a color conversion table associated with specific colors and defines conversion from an input color into an output color. On the other hand, if the specific color is not designated, the control command analysis unit 115 sets an LUT for normal colors in the color conversion unit 117.

A rendering unit 116 performs rendering of the PDL command and generates a bitmap. The color conversion unit 117 converts, using the set LUTs, the bitmap generated by the rendering unit 116 from a PDL command color space into a print color space. An image forming unit 118 converts, into a printable image, the bitmap that has been converted into a print color space, and executes image formation.

A specific color-associated LUT generation unit 105 stores a designated output value at a vacant grid point in the specific color-associated LUT if an instruction to store the specific color is given from the printer driver 102. The specific color-associated LUT generation unit 105 also returns a color value denoting this grid point to the printer driver 102. A color conversion table saving unit 106 stores the normal color LUT and the generated specific color-associated LUT.

The image forming apparatus 103 has a CPU that executes processing operations such as image processing and image formation including various kinds of calculation, control, discrimination, and the like, a ROM that stores programs and the like, and a RAM that temporarily stores data on which the CPU is performing a processing operation, input data, and the like, for example. Note that control of later-described color conversion and image formation is realized by the CPU of the image forming apparatus 103 reading out corresponding control programs from the ROM and executing them.

Figure 2:
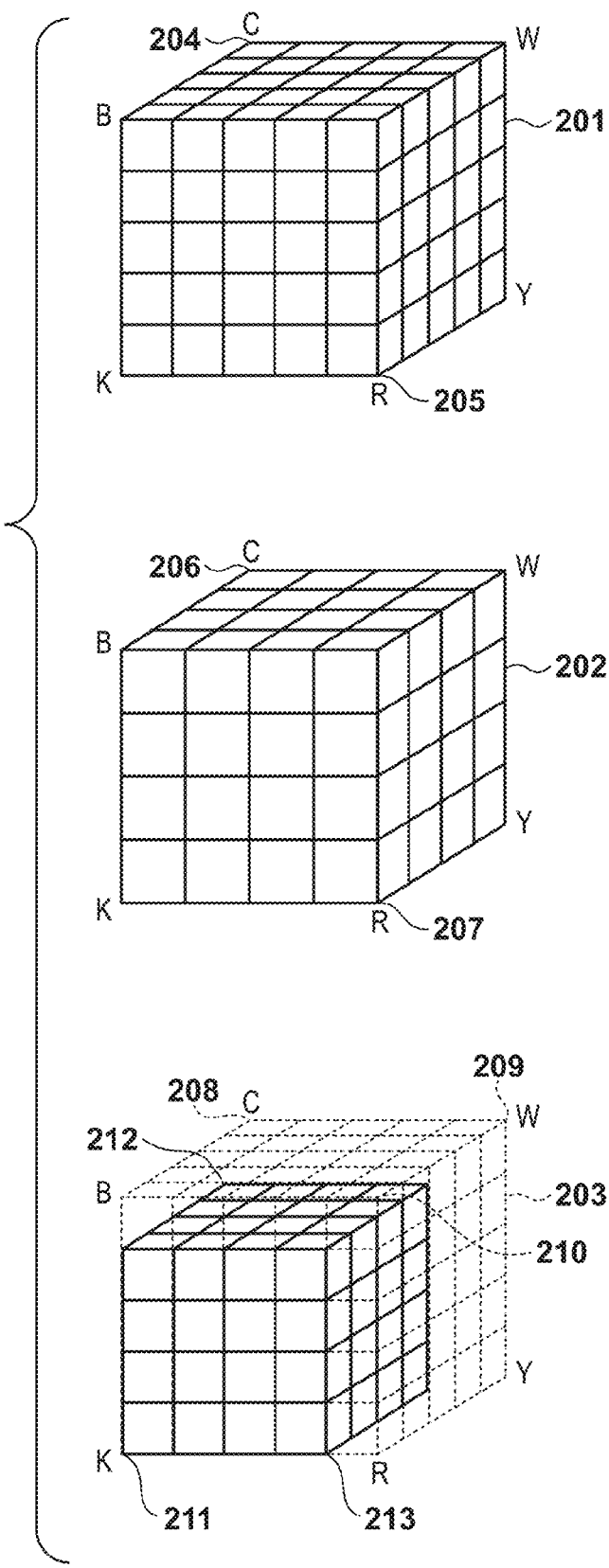
FIG. 2 is a diagram illustrating generation of a specific color-associated LUT.

FIG. 2 is a diagram illustrating generation of the specific color-associated LUT. The specific color-associated LUT is generated based on a normal color LUT 201, which is used in normal color conversion processing. The normal color LUT is configured as a one-dimensional or multidimensional LUT (i.e., LUT having one or more axes) that has N grid points in each axial direction. In this description, N=6, and a three-dimensional LUT will be used that has 6×6×6 grid points at which output values indicated by CMYK are set with respect to input values indicated by RGB.

A grid point-reduced LUT 202 is an LUT that is regenerated by reducing the number of grid points from the normal color LUT 201. A specific color-associated LUT 203 is obtained by rearranging the grid point-reduced LUT 202 into an LUT having the number of grid points that is equal to that before reducing the grid points (i.e., that in the normal color LUT 201) and newly storing output colors at unused grid points. That is to say, a conversion table is rearranged such that a three-dimensional space, which is a partial internal space of the specific color-associated LUT 203 and has 5×5×5 grid points, shows the entire color space indicated by the normal color LUT 201. Unused grid points are secured by thus reducing the number of grid points to be used.

In the normal color LUT 201, an output value (C, M, Y, K)=(176, 0, 0, 0) is stored at a grid point 204 on the coordinates (R, G, B)=(0, 5, 5). An output value (C, M, Y, K)=(0, 200, 200, 0) is stored at a grid point 205 on the coordinates (R, G, B)=(5, 0, 0).

The grid point-reduced LUT 202 is obtained by reducing the number of grid points by M (here, M=1) from the normal color LUT 201. That is to say, the grid point-reduced LUT 202 is a three-dimensional LUT having 5×5×5 grid points. An output value (C, M, Y, K)=(176, 0, 0, 0) is stored at a grid point 206 on the coordinates (R, G, B)=(0, 4, 4). An output value (C, M, Y, K)=(0, 200, 200, 0) is stored at a grid point 207 on the coordinates (R, G, B)=(4, 0, 0).

The specific color-associated LUT 203 is obtained by rearranging the grid point-reduced LUT 202 in a three-dimensional LUT having 6×6×6 grid points. That is to say, in the specific color-associated LUT 203, an output value (C, M, Y, K)=(176, 0, 0, 0) is stored at a grid point 212 on the coordinates (R, G, B)=(0, 4, 4). An output value (C, M, Y, K)=(0, 200, 200, 0) is stored at a grid point 213 on the coordinates (R, G, B)=(4, 0, 0). Furthermore, in the specific color-associated LUT 203, an output value (C, M, Y, K)=(255, 0, 0, 0) is set at a grid point 208 on the coordinates (R, G, B)=(0, 5, 5). An output value (C, M, Y, K)=(0, 255, 0, 0) is set at a grid point 210 on the coordinates (R, G, B)=(5, 0, 5). An output value (C, M, Y, K)=(0, 0, 0, 255) is set at a grid point 211 on the coordinates the (R, G, B)=(0, 0, 0).

Description of Color Processing

Figure 6:
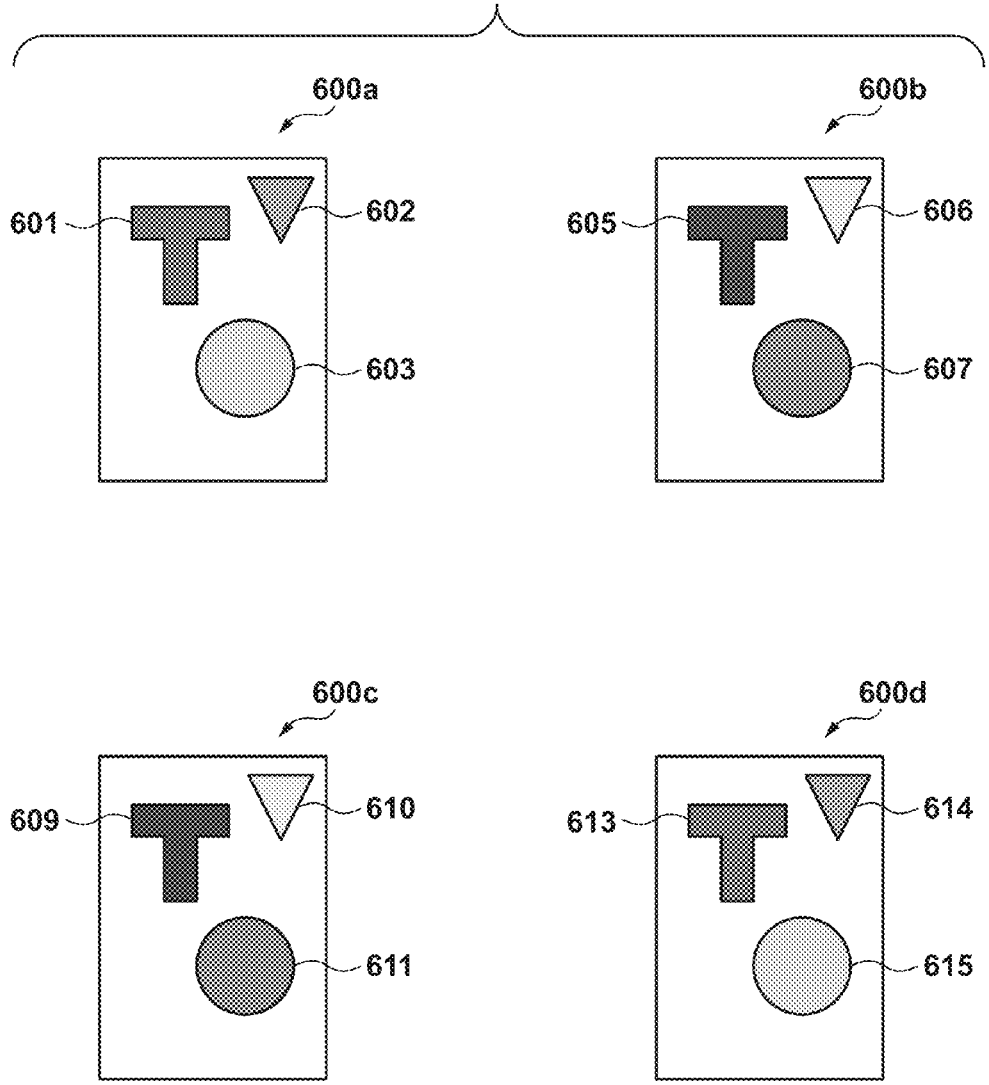
FIG. 6 is a diagram illustratively showing changes of images indicated by data in each step in the first embodiment.

FIG. 6 is a diagram illustratively showing changes of images indicated by data in each step in the first embodiment. Specifically, FIG. 6 shows changes of images indicated by the PDL command processed by the printer driver 102 and the bitmaps processed by the image forming apparatus.

An image 600a is an image indicated by the command generated by the application. An image 600b is an image indicated by the PDL command obtained after color value linear compression is performed on the command indicating the image 600a. An image 600c is an image indicated by the bitmap generated by the image forming apparatus 103 based on the PDL command indicating the image 600b. An image 600d is an image indicated by the bitmap obtained after color conversion is performed on the bitmap of the image 600c.

System Operations

Figure 3:
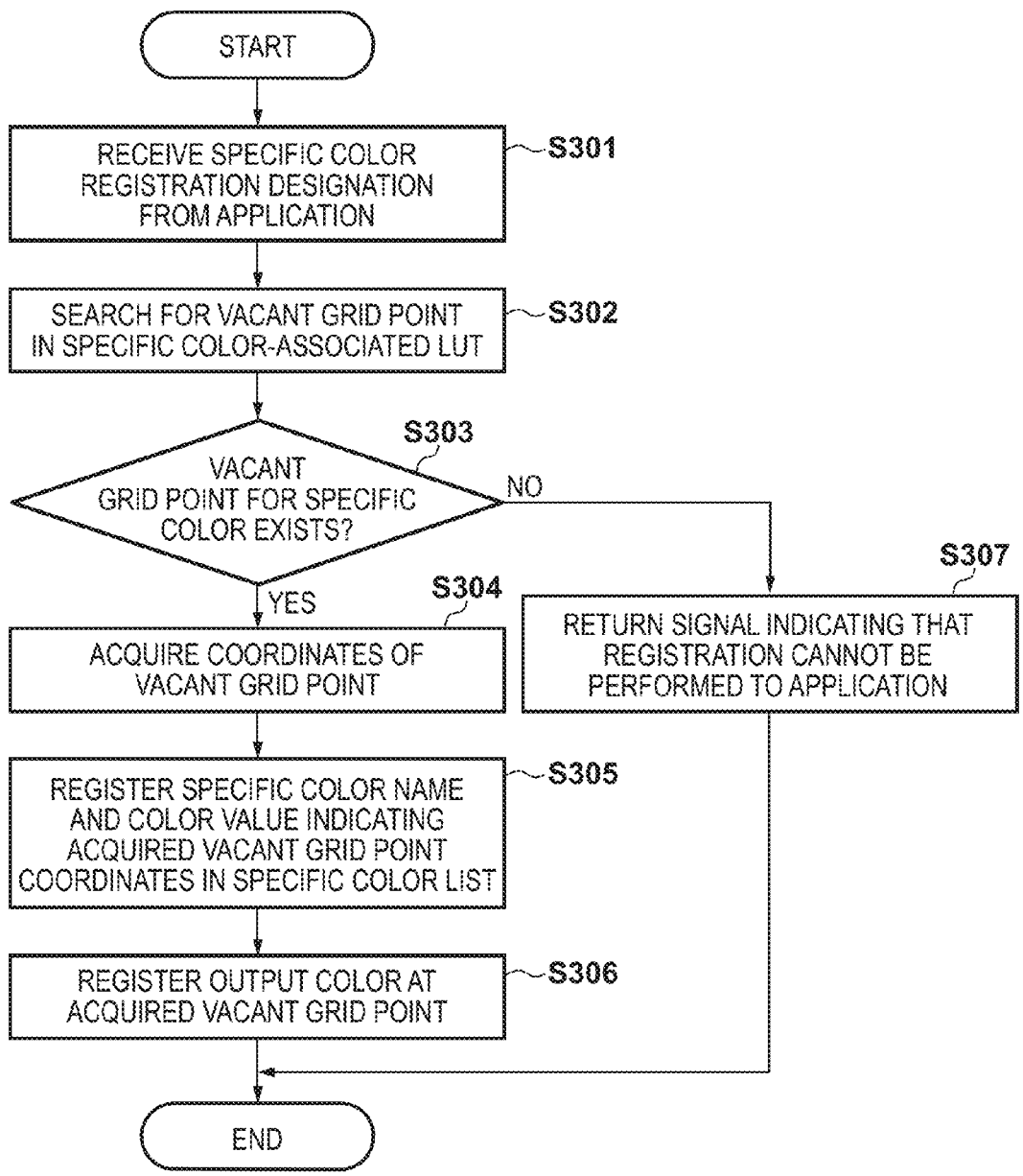
FIG. 3 is a flowchart showing a procedure from registration of a specific color up to generation of a list.

FIG. 3 is a flowchart showing a procedure from registration of a specific color up to generation of a list. Specifically, the printer driver 102 is processing for storing the output value of the specific color designated by the application 101 at a vacant grid point in an LUT in the image forming apparatus 103, and generating a specific color list that is to be managed by the driver.

In step S301, the specific color list generation unit 104 accepts specific color registration designation from the application 101 (accepting unit). In this description, designation of registration of the specific color regarding which "SKYBLUE" and "(C, M, Y, K)=(153, 20, 0, 0)" are designated respectively as "color name" and "color agent mixing ratio (output color)" is received.

In step S302, the specific color list generation unit 104 inquires the specific color-associated LUT generation unit 105 in the image forming apparatus 103 of whether there is a vacant grid point in a specific color-associated LUT 801.

Figures 7, 8:
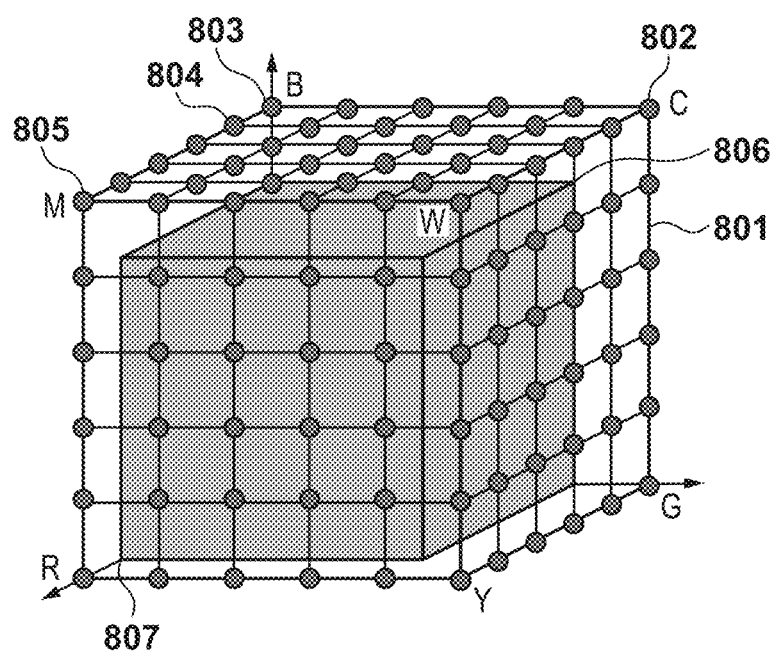
FIG. 7 is a diagram illustratively showing a specific color list in which specific colors are registered.
FIG. 8 is a diagram illustratively showing the specific color-associated LUT.

FIG. 8 is a diagram illustratively showing the specific color-associated LUT. Here, the specific color-associated LUT 801 has the same structure as the specific color-associated LUT 203 described in FIG. 2.

An output value (C, M, Y, K)=(176, 0, 0, 0) is stored at a grid point 806 in the specific color-associated LUT 801. An output value (C, M, Y, K)=(0, 200, 200, 0) is stored at a grid point 807. An output value (C, M, Y, K)=(255, 0, 0, 0) is stored at a grid point 802. An output value (C, M, Y, K)=(0, 255, 0, 0) is stored at a grid point 805.

If, in step S303, there is a vacant grid point, in step S304, the specific color-associated LUT generation unit 105 acquires the vacant grid point coordinates (R, G, B)=(0, 0, 5) and returns it to the specific color list generation unit 104. On the other hand, if there is no vacant grid point, in step S307, the specific color-associated LUT generation unit 105 replies to the application 101 that registration cannot be performed, and thereafter ends the processing.

In step S305, the specific color list generation unit 104 converts the vacant grid point coordinates (R, G, B)=(0, 0, 5) into a color value (R, G, B)=(0, 0, 255) indicated by this grid point, and registers this color value in a specific color list 701 in association with the color name "SKYBLUE" of the specific color. FIG. 7 is a diagram illustratively showing a specific color list in which specific colors are registered.

In step S306, the specific color list generation unit 104 transmits a signal to the image forming apparatus 103 so as to store the output value (C, M, Y, K)=(153, 20, 0, 0) on the vacant grid point coordinates (R, G, B)=(0, 0, 5). The specific color-associated LUT generation unit 105 thereby stores the output value (C, M, Y, K)=(153, 20, 0, 0) at the grid point 803 having the grid point coordinates (R, G, B)=(0, 0, 5).

With the above processing, output color information regarding the specific color "SKYBLUE" is associated with the specific color list managed by the printer driver 102 and the specific color-associated LUT managed by the image forming apparatus 103.

Note that, although the specific color-associated LUT is generated by the image forming apparatus 103 in the above description, the specific color-associated LUT may be generated by the application 101 or the printer driver 102. In this case, the specific color-associated LUT generated by the application 101 or the printer driver 102 is downloaded onto the image forming apparatus 103.

Figure 4:
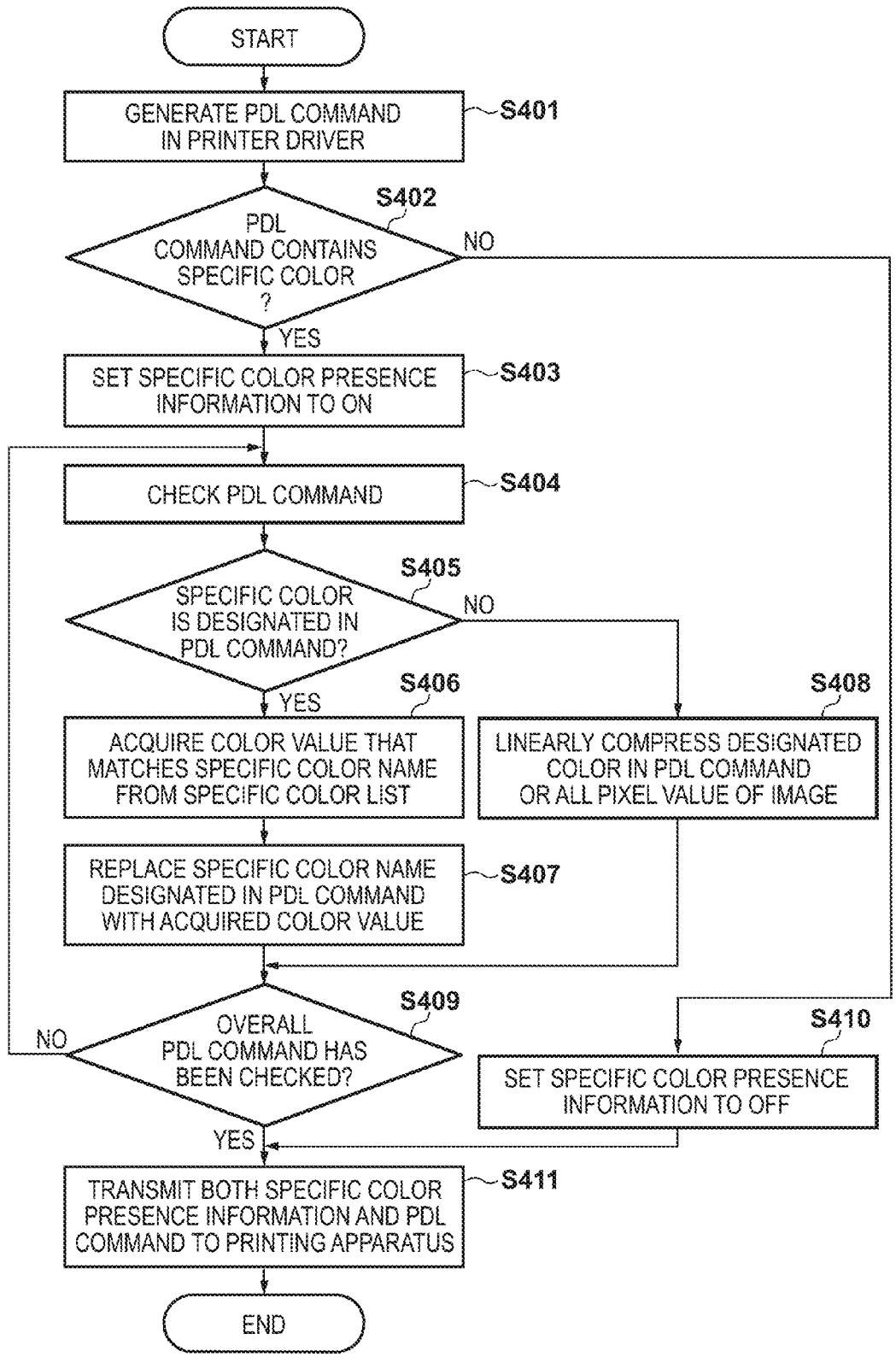
FIG. 4 is a flowchart showing a procedure from generation of a PDL command up to transmission to an image forming apparatus in the first embodiment.

FIG. 4 is a flowchart showing a procedure from generation of the PDL command up to transmission to the image forming apparatus in the first embodiment.

In step S401, the PDL command generation unit 107 in the printer driver 102 generates the PDL command while checking whether or not the command received from the application 101 contains the specific color. In this description, the PDL indicating the image 600a in FIG. 6 is generated. Assume that, regarding the image 600a, the color value of an object 601 is (R, G, B)=(255, 0, 0), the color value of an object 603 is (R, G, B)=(255, 0, 255), and the specific color "SKYBLUE" is designated as the color value of an object 602.

In step S402, if the PDL command generation unit 107 determines that the received command contains the specific color, the PDL command generation unit 107 transmits a signal indicating that the specific color is contained to the control command generation unit 111, and the processing proceeds to step S403. On the other hand, if the PDL command generation unit 107 determines that the received command does not contain the specific color, the PDL command generation unit 107 transmits a signal indicating that the specific color is not contained to the control command generation unit 111, and the processing proceeds to step S410.

In step S403, the control command generation unit 111 sets, to "ON", the specific color presence information indicating whether or not there is an object for which the specific color is designated, and the processing proceeds to step S404. In step S404, the specific color determination unit 108 checks whether the normal color is designated or the specific color is designated for a part of the PDL command, and the processing proceeds to step S405. In step S405, if the specific color determination unit 108 determines that the specific color is designated for an object contained in the PDL command, the processing proceeds to step S406. On the other hand, if it is determined that the normal color is designated for an object contained in the PDL command, the processing proceeds to step S408.

In step S406, the specific color replacement unit 110 (color value replacement unit) acquires the specific color list 701 from the specific color list generation unit 104. In step S407, the specific color replacement unit 110 replaces the color name of the specific color designated for the object with the color value registered in the specific color list 701. Here, since the specific color "SKYBLUE" is designated for the object 602, "SKYBLUE" is replaced with (R, G, B)=(0, 0, 255) based on the specific color list 701 to generated information regarding an object 606.

In step S408, the color value linear compression calculation unit 108 (color value compression unit) linearly compresses the color value of the objects contained in the PDL command. Here, the color value (R, G, B)=(255, 0, 0) of the object 601 for which the normal color is designated is multiplied by (6−2)/(6−1)=4/5. That is to say, information regarding an object 605 is generated with (R, G, B)=(255×4/5, 0×4/5, 0×4/5)=(204, 0, 0). Also, the color value (R, G, B)= (255, 0, 255) of the object 603 for which the normal color is designated is multiplied by (6−2)/(6−1)=4/5 to obtain (R, G, B)=(255×4/5, 0×4/5, 255×4/5)=(204, 0, 204), and information regarding an object 607 is generated therewith.

In step S409, it is checked whether all objects contained in the PDL command have been checked, and if the check has not finished, the processing proceeds to step S404, and the above processing is repeated. On the other hand, if the check has finished, the processing proceeds to step S411.

In step S410, the control command generation unit 111 sets, to "OFF", the specific color presence information indicating whether or not there is an object for which the specific color is designated, and the processing proceeds to step S411. In step S411, the PDL command transmission unit 112 transmits the PDL command to the image forming apparatus 103 and ends the processing. Here, the PDL command containing the object for which the specific color is designated is transmitted together with the specific color presence information that is "ON".

Figure 5:
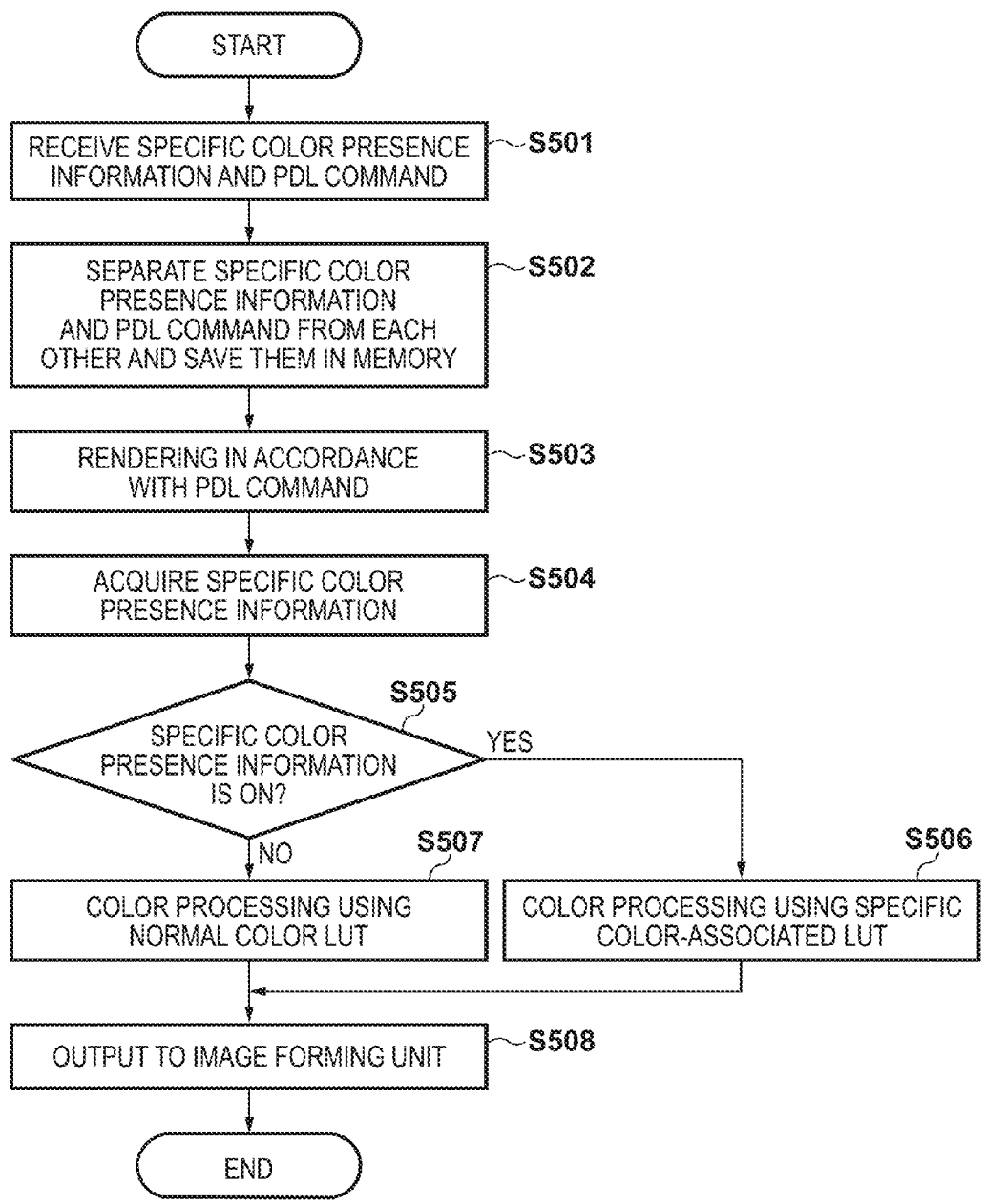
FIG. 5 is a flowchart showing a procedure from reception of the PDL command up to image formation in the first embodiment.

FIG. 5 is a flowchart showing a procedure from reception of the PDL command up to image formation in the first embodiment. That is to say, it is a flowchart showing a procedure performed in the image forming apparatus 103 after the flow described in FIG. 4 is performed.

In step S501, the PDL command reception unit 113 in the image forming apparatus 103 receives the specific color presence information and the PDL command, and the processing proceeds to step S114. Here, the received specific color presence information is "ON", and the PDL command indicates the image 600b.

In step S502, the control command separation unit 114 separates the specific color presence information and the PDL command from each other and saves them in a memory. In step S503, the rendering unit 116 performs rendering of the PDL command indicating the image 600b, and generates a bitmap shown as the image 600c. In step S504, the control command analysis unit 115 acquires the specific color presence information saved in the memory.

In step S505, if the control command analysis unit 115 determines that the specific color presence information is "ON", the processing proceeds to step S506. On the other hand, if the control command analysis unit 115 determines that the specific color presence information is "OFF", the processing proceeds to step S507.

In step S506, the control command analysis unit 115 acquires the specific color-associated LUT 801 from the color conversion table saving unit 106, and transmits it to the color conversion unit 117. The color conversion unit 117 thereby performs color conversion on the bitmap.

Here, the color value (R, G, B)=(204, 0, 0) of an object 609 on the bitmap shown as the image 600c is obtained via the grid point 807 on the coordinates (R, G, B)=(4, 0, 0) in the specific color-associated LUT 801. Specifically, the color value (R, G, B)=(204, 0, 0) is converted into an output value (C, M, Y, K)=(0, 200, 200, 0), which is to be obtained as information regarding an object 613 on the bitmap shown as the image 600d.

Also, the color value (R, G, B)=(204, 0, 204) of an object 611 on the bitmap shown as the image 600c is obtained via the grid point 806 on the coordinates (R, G, B)=(4, 0, 4) in the specific color-associated LUT 801. Specifically, the color value (R, G, B)=(204, 0, 204) is converted into an output value (C, M, Y, K)=(176, 0, 0, 0), which is to be obtained as information regarding an object 615 on the bitmap shown as the image 600d.

Furthermore, the color value (R, G, B)=(0, 0, 255) of an object 610 on the bitmap shown as the image 600c is obtained via the coordinates (R, G, B)=(0, 0, 5) in the specific color-associated LUT 801. Specifically, the color value (R, G, B)= (0, 0, 255) is converted into an output value (C, M, Y, K)= (153, 20, 0, 0), which is to be obtained as information regarding an object 614 on the bitmap shown as the image 600d. The bitmap shown as the image 600d is thus generated.

In step S507, the control command analysis unit 115 acquires the normal color LUT from the color conversion table saving unit 106 and delivers it to the color conversion unit 117, the color conversion unit 117 performs color conversion on the bitmap, and the processing proceeds to step S508.

In step S508, the image forming unit 118 converts the bitmap into a printable image, executes image formation processing, and ends the processing.

As described above, according to the first embodiment, unified color processing can be performed by using the specific color-associated LUT obtained by allocating an output color of the specific color to a vacant grid point in an LUT. Specifically, it is possible, only by executing color conversion using the LUT once after generating the bitmap, to allocate a predetermined output color (color agent mixing ratio) to the specific color and perform color processing that is equivalent to color processing using the normal color LUT, on colors other than the specific color.

Second Embodiment

A second embodiment will describe the case of designating a color to be used in a copy-forgery-inhibited pattern (CFIP) as the specific color. In particular, a description will be given below of an example of using cyan, magenta, and black for the CFIP.

System Configuration

Figure 9:
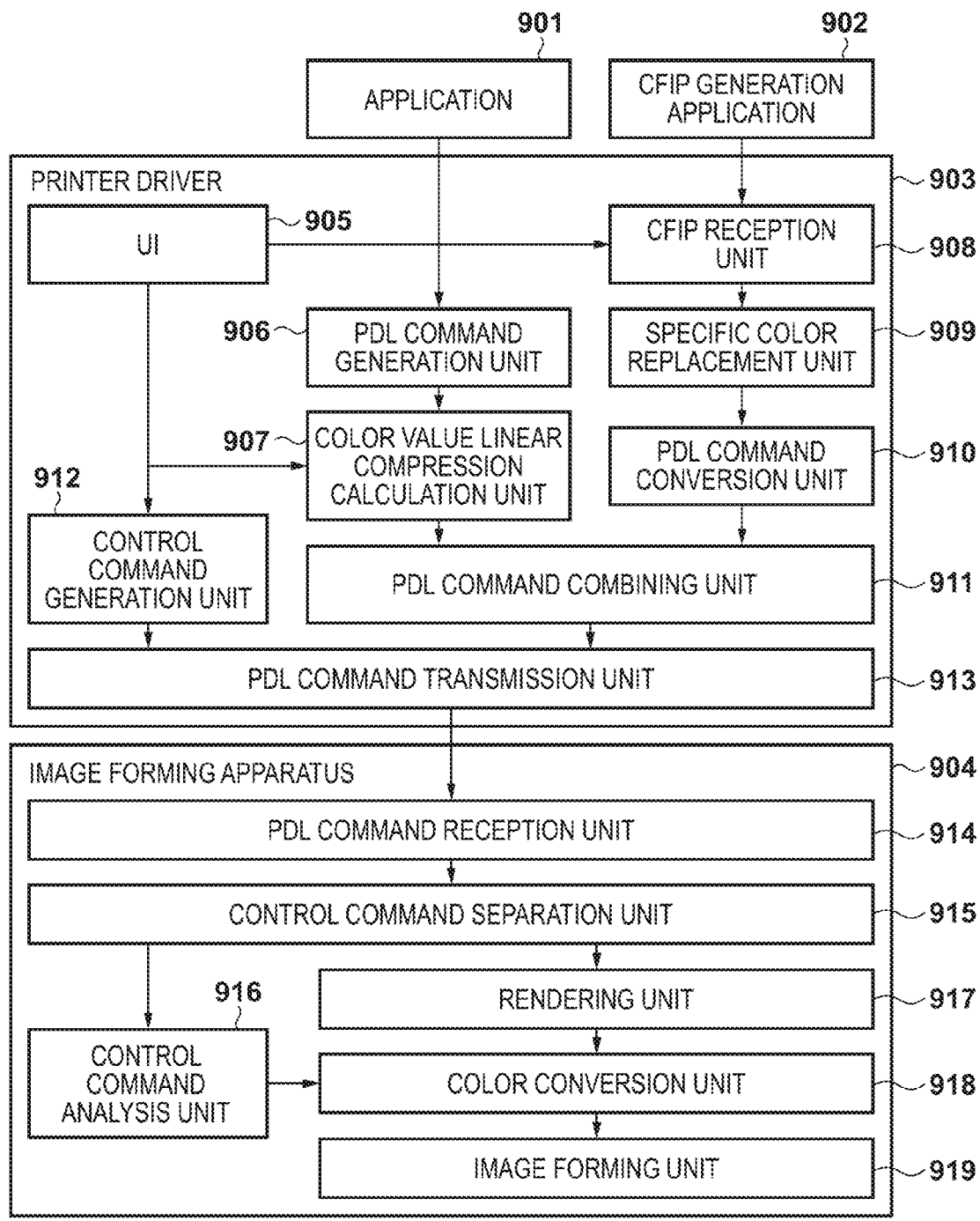
FIG. 9 is a block diagram showing a configuration of an image processing system according to a second embodiment.

FIG. 9 is a block diagram showing a configuration of an image processing system according to the second embodiment. In this diagram, an application 901 is a program that creates a document, creates a diagram, and performs image processing and the like on the PC. A CFIP generation application 902 is a program for generating a CFIP image. Note that the CFIP image is a pattern image configured such that, when a printed matter on which the CFIP image is printed is copied, an image appears which indicates that the copy is not an original printed matter. The printer driver 903 is a program for converting data generated by the application 901 into command data (hereinafter referred to as a PDL command) described in a printer description language that is interpretable for an image forming apparatus 904.

The printer driver 903 is a program for converting data (input image and CFIP image) generated by the application 901 and the CFIP generation application 902 into command data (hereinafter referred to as a PDL command) described in a printer description language that is interpretable for the image forming apparatus 904.

A user interface (UI) 905 is an interface with which a user gives a control instruction to the printer driver 903. A PDL command generation unit 906 converts a command received from the application 901 into a PDL command. A CFIP reception unit 908 receives the CFIP image from the CFIP generation application 902. A control command generation unit 912 generates a control command (later-described CFIP addition information) indicating whether or not the CFIP is added to the PDL command.

A specific color replacement unit 909 replaces the specific color designated for the CFIP image with a specific color value. A PDL command conversion unit 910 converts the CFIP image and the color value replaced by the specific color replacement unit 909 into a PDL command. A color value linear compression calculation unit 907 linearly compresses the color value of the PDL command if the CFIP is added. A PDL command combining unit 911 combines the PDL commands obtained from the color value linear compression calculation unit 907 and the PDL command conversion unit 910. A PDL command transmission unit 913 transmits the generated PDL command to the image forming apparatus.

Note that the application 901, the CFIP generation application 902, and the printer driver 903 are executed on the PC, for example. The PC has a CPU that executes processing operations including various kinds of calculation, control, discrimination, and the like, a ROM that stores programs and the like, and a RAM that temporarily stores data on which the CPU is performing a processing operation, input data, and the like, for example. The PC reads out various programs such as the application 901, the CFIP generation application 902, and the printer driver 903 from the RAM, and executes them using the CPU.

The image forming apparatus 904 is an apparatus that receives the PDL command from the printer driver 903, generates printable data, and executes image formation (printing).

A PDL command reception unit 914 receives the PDL command from the printer driver 903. A control command separation unit 915 separates the control command from the received PDL command. A control command analysis unit 916 analyzes whether or not addition of the CFIP is designated in the control command separated from the PDL command. If addition of the CFIP is designated, the control command analysis unit 916 then sets an LUT, which is a color conversion table associated with specific colors, in a color conversion unit 918. On the other hand, if addition of the CFIP is not designated, the control command analysis unit 916 sets an LUT for normal colors in the color conversion unit 918.

A rendering unit 917 performs rendering of the PDL command and generates a bitmap. The color conversion unit 918 converts, using the set LUTs, the bitmap generated by the rendering unit 917 from a PDL command color space into a print color space. An image forming unit 919 converts, into a printable image, the bitmap that has been converted into a print color space, and executes image formation.

The image forming apparatus 904 has a CPU that executes processing operations such as image processing and image formation including various kinds of calculation, control, discrimination, and the like, a ROM that stores programs and the like, and a RAM that temporarily stores data on which the CPU is performing a processing operation, input data, and the like, for example. Note that control of later-described color conversion and image formation is realized by the CPU of the image forming apparatus 904 reading out corresponding control programs from the ROM and executing them.

Description of Color Processing

Figure 12:
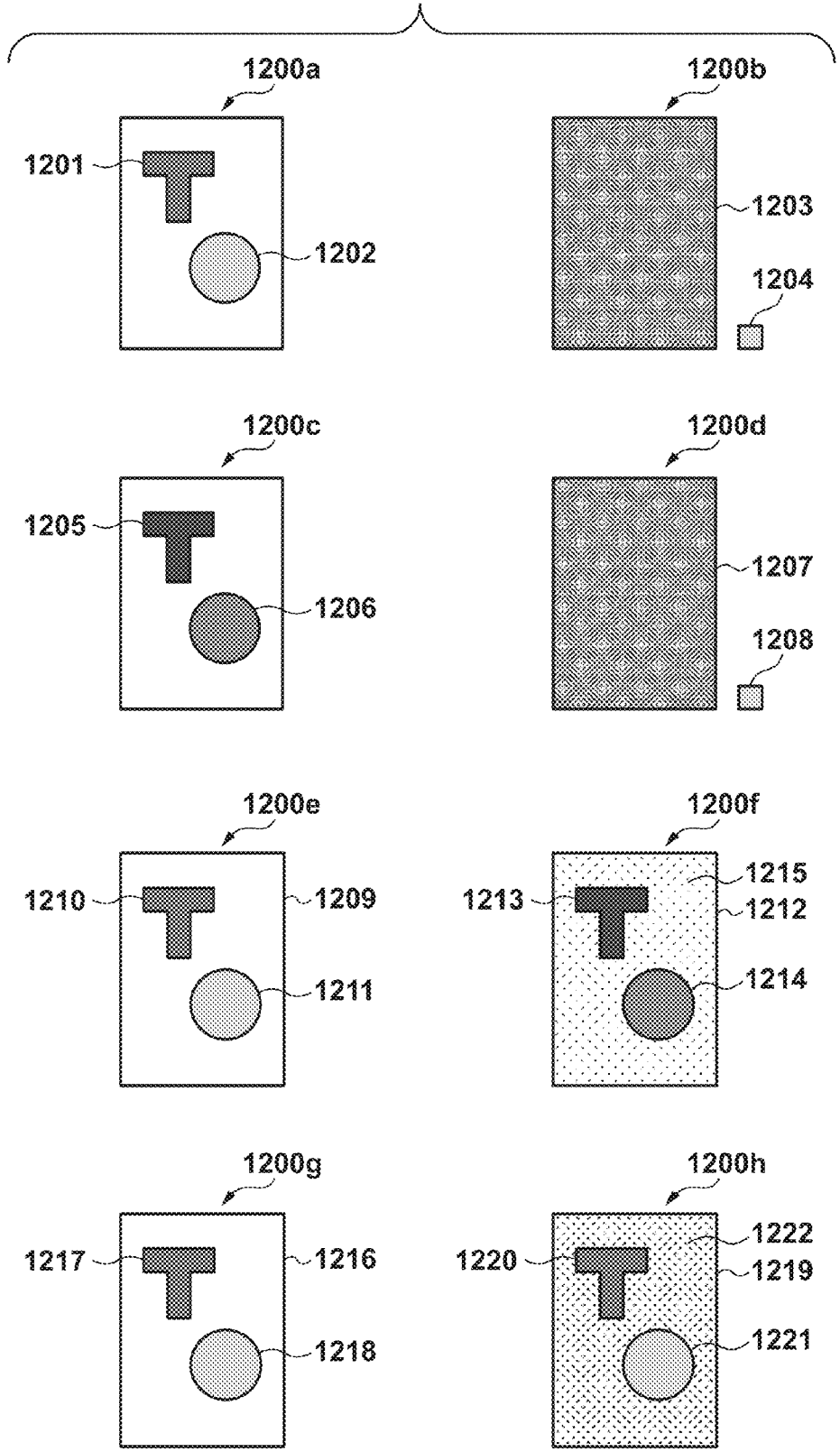
FIG. 12 is a diagram illustratively showing changes of images indicated by data in each step in the second embodiment.

FIG. 12 is a diagram illustratively showing changes of images indicated by data in each step in the second embodiment. Specifically, FIG. 12 shows changes of images indicated by the PDL command processed by the printer driver 903 and the bitmaps processed by the image forming apparatus.

An image 1200a is an image indicated by the command generated by the application 901. An image 1200b shows a CFIP 1203 and a designated color 1204 that are indicated by the command generated by the CFIP generation application 902.

An image 1200c is an image indicated by the PDL command obtained after color value linear compression is performed on the command indicating the image 1200a, in the case of adding the CFIP. An image 1200d shows a CFIP 1207 and a designated color 1208 obtained after the color values of the CFIP of the image 1200b are replaced by the specific color replacement unit 909.

An image 1200e is an image indicated by the bitmap generated by the image forming apparatus 904 based on the command indicating the image 1200a, in the case of not adding the CFIP. An image 1200f is an image indicated by the bitmap generated by the image forming apparatus 904 based on the command of the image 1200c, in the case of adding the CFIP.

An image 1200g is an image indicated by the bitmap obtained after color conversion is performed on the bitmap of the image 1200e, in the case of not adding the CFIP. An image 1200h is an image indicated by the bitmap obtained after color conversion is performed on the bitmap of the image 1200f, in the case of adding the CFIP.

System Operations

Figure 10:
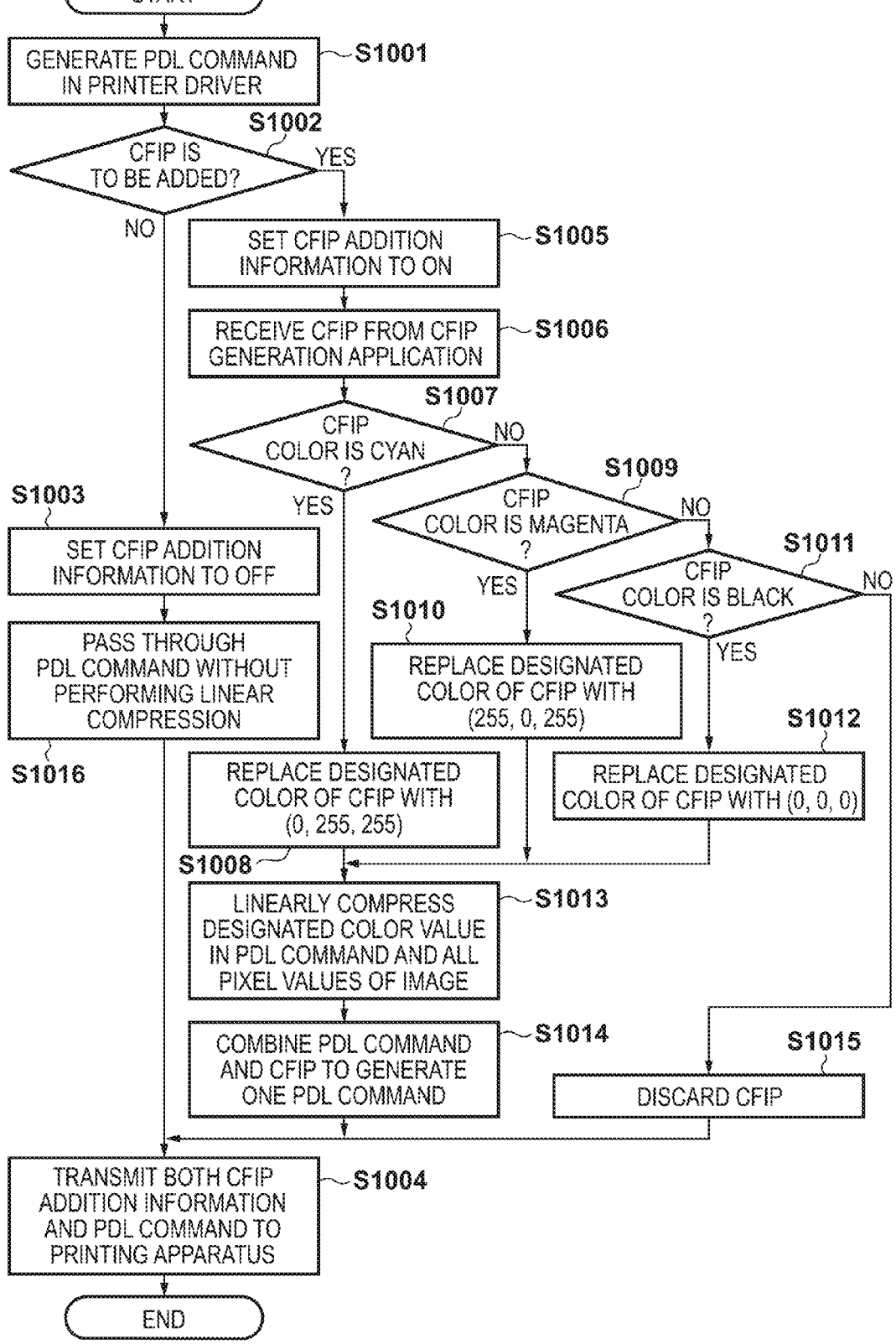
FIG. 10 is a flowchart showing a procedure from generation of a PDL command up to transmission to an image forming apparatus in the second embodiment.

FIG. 10 is a flowchart showing a procedure from generation of the PDL command up to transmission to the image forming apparatus in the second embodiment.

In step S1001, the PDL command generation unit 906 generates objects 1201 and 1202 from a command received from the application 901. Here, the designated color of the object 1201 is (R, G, B)=(255, 0, 0), and the designated color of the object 1202 is (R, G, B)=(255, 0, 255).

In step S1002, the UI 905 of the printer driver 903 checks whether addition of the CFIP is set, and if addition of the CFIP is not set, the processing proceeds to step S1003. On the other hand, if addition of the CFIP is set, the processing proceeds to step S1005.

In step S1003, the control command generation unit 912 sets the CFIP addition information to "OFF" to generate a control command. In step S1016, the color value linear compression calculation unit 907 configures a setting of not performing calculation, and passes through the PDL command as-is. The PDL command combining unit 913 generates PDL commands for the objects 1201 and 1202, and the processing proceeds to step S1004.

In step S1004, the PDL command transmission unit 913 transmits the CFIP addition information, which is the control command, and the PDL commands for the objects 1201 and 1202 to the image forming apparatus 904.

In step S1005, the control command generation unit 912 sets the CFIP addition information to "ON" to generate a control command. In step S1006, the CFIP reception unit 908 receives the CFIP image 1203 and the designated color 1204 of the CFIP from the CFIP generation application 902. In step S1007, the specific color replacement unit 909 checks the designated color 1204 of the CFIP, and if the designated color is cyan, the processing proceeds to step S1008. On the other hand, if the designated color 1204 of the CFIP is not cyan, the processing proceeds to step S1009.

In step S1008, the specific color replacement unit 909 replaces the designated color 1204 of the CFIP with (R, G, B)=(0, 255, 255), and the PDL command conversion unit 910 generates the objects 1207 and 1208.

In step S1009, the specific color replacement unit 909 checks the designated color 1204 of the CFIP, and if the designated color is magenta, the processing proceeds to step S1010. On the other hand, if the designated color 1204 of the CFIP is not magenta, the processing proceeds to step S1011. In step S1010, the specific color replacement unit 909 replaces the designated color 1204 of the CFIP with (R, G, B)=(255, 0, 255), and the PDL command conversion unit 910 generates the objects 1207 and 1208.

In step S1011, the specific color replacement unit 909 checks the designated color 1204 of the CFIP, and if the designated color is black, the processing proceeds to step S1012. On the other hand, if the designated color 1204 of the CFIP is not black, the processing proceeds to step S1015. In step S1012, the specific color replacement unit 909 replaces the designated color 1204 of the CFIP with (R, G, B)=(0, 0, 0), and the PDL command conversion unit 910 generates the objects 1207 and 1208.

In step S1013, the color value linear compression calculation unit 907 linearly compresses designated color values of the objects 1201 and 1202. Here, the designated color values are multiplied by (6−2)/(6−1)=4/5 to regenerate objects 1205 and 1206. Here, the designated color of the object 1205 is (R, G, B)=(255×4/5, 0×4/5, 0×4/5)=(204, 0, 0). The designated color of the object 1206 is (R, G, B)=(255×4/5, 0×4/5, 255×4/5)=(204, 0, 204).

In step S1014, the PDL command combining unit 911 combines the objects 1205, 1206, 1207, and 1208 to regenerate a PDL command, and the processing proceeds to step S1004. On the other hand, in step S1015, the CFIP image 1203 and the designated color 1204 of the CFIP are discarded, the processing of the PDL command combining unit 911 is passed through, and the processing proceeds to step S1004.

In step S1004, the PDL command transmission unit 913 transmits the regenerated PDL command to the image forming apparatus 904. Here, the PDL command contains the CFIP addition information, which is the control command, and the objects 1205, 1206, 1207, and 1208.

Figure 11:
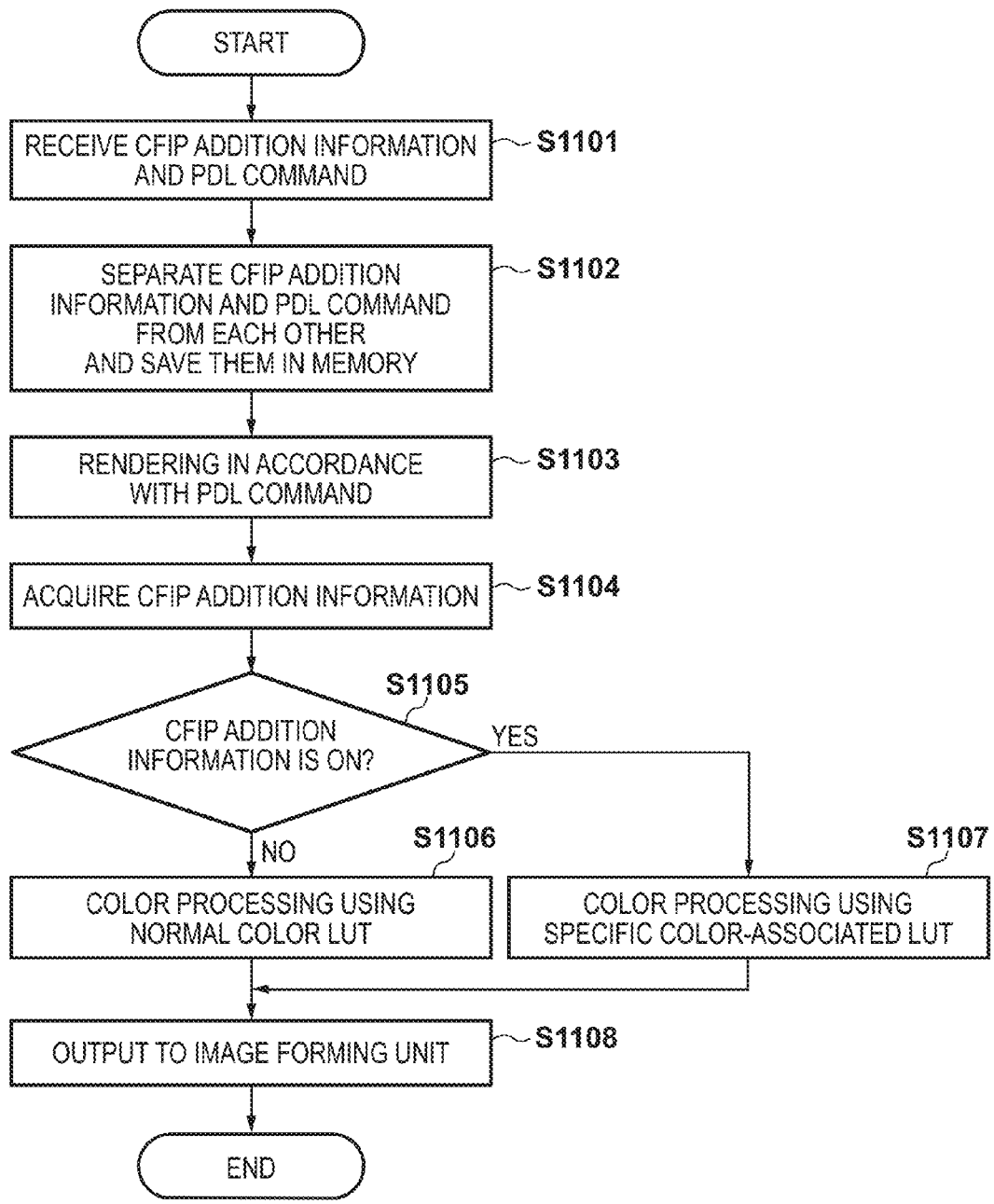
FIG. 11 is a flowchart showing a procedure from reception of the PDL command up to image formation in the second embodiment.

FIG. 11 is a flowchart showing a procedure from reception of the PDL command up to image formation in the second embodiment. That is to say, it is a flowchart showing a procedure performed in the image forming apparatus 904 after the flow described in FIG. 10 is performed.

In step S1101, the PDL command reception unit 914 in the image forming apparatus 904 receives the PDL command transmitted from the printer driver 903. In step S1102, the control command separation unit 915 separates the control command from the PDL command.

In step S1103, the rendering unit 917 renders the objects 1201 and 1202 or the objects 1205, 1206, 1207, and 1208 that are contained in the PDL command, and generates a bitmap 1209 or a bitmap 1212.

In step S1104, the control command analysis unit 916 acquires the CFIP addition information. In step S1105, the control command analysis unit 916 checks whether the CFIP addition information is "ON", and if it is "OFF" (i.e., not "ON"), the processing proceeds to step S1106. On the other hand, if the CFIP addition information is "ON", the processing proceeds to step S1107.

In step S1106, the color conversion unit 918 performs color processing on the bitmap 1209 using the normal color LUT 201, and generates the bitmap 1216. Here, for the color value (R, G, B)=(255, 0, 0) of an object 1210 on the bitmap 1209, the grid point 205 on the coordinates (R, G, B)=(5, 0, 0) in the normal color LUT 201 is referenced. Accordingly, the color value of an object 1217 on the bitmap 1216 is (C, M, Y, K)=(0, 200, 200, 0).

Also, for the color value (R, G, B)=(255, 0, 255) of an object 1211 on the bitmap 1209, the grid point 204 on the coordinates (R, G, B)=(0, 5, 5) in the normal color LUT 201 is referenced. Accordingly, the color value of an object 1218 on the bitmap 1216 is (C, M, Y, K)=(176, 0, 0, 0).

In step S1107, the color conversion unit 918 performs color conversion on the bitmap 1212 using the specific color-associated LUT 203, and generates the bitmap 1219. Here, for the color value (R, G, B)=(204, 0, 0) of an object 1213 on the bitmap 1212, the grid point 213 on the coordinates (R, G, B)=(4, 0, 0) in the specific color-associated LUT 203 is referenced. Accordingly, the color value of an object 1220 on the bitmap 1219 is (C, M, Y, K)=(0, 200, 200, 0). Also, for the color value (R, G, B)=(204, 0, 204) of an object 1214 on the bitmap 1212, the grid point 212 on the coordinates (R, G, B)=(0, 4, 4) in the specific color-associated LUT 203 is referenced. Accordingly, the color value of an object 1221 on the bitmap 1219 is (C, M, Y, K)=(176, 0, 0, 0).

Furthermore, for the color value (R, G, B)=(255, 0, 255) of an object 1215 on the bitmap 1212, the grid point 208 on the coordinates (R, G, B)=(0, 5, 5) in the specific color-associated LUT 203 is referenced. Accordingly, the color value of an object 1222 on the bitmap 1219 is (C, M, Y, K)=(255, 0, 0, 0).

In step S1108, the image forming unit 919 converts the bitmap into a printable image, executes image formation processing, and ends the processing.

As described above, according to the second embodiment, the CFIP can be printed out more preferably by designating the color to be used in the CFIP as the specific color. Specifically, it is possible to prevent collapse or disappearance of the CFIP resulting from occurrence of interference with dithering processing. On the other hand, an image created by the application can be output with colors close to display colors on a display unit, as in usual printing.

Third Embodiment

A third embodiment will describe another example of designating a color to be used in the CFIP as the specific color. In particular, a description will be given below of a method for saving the CFIP before image formation and again adding the CFIP after image formation. Note that a description will be given below of an example of using cyan, magenta, and black for the CFIP.

System Configuration

Figure 13:
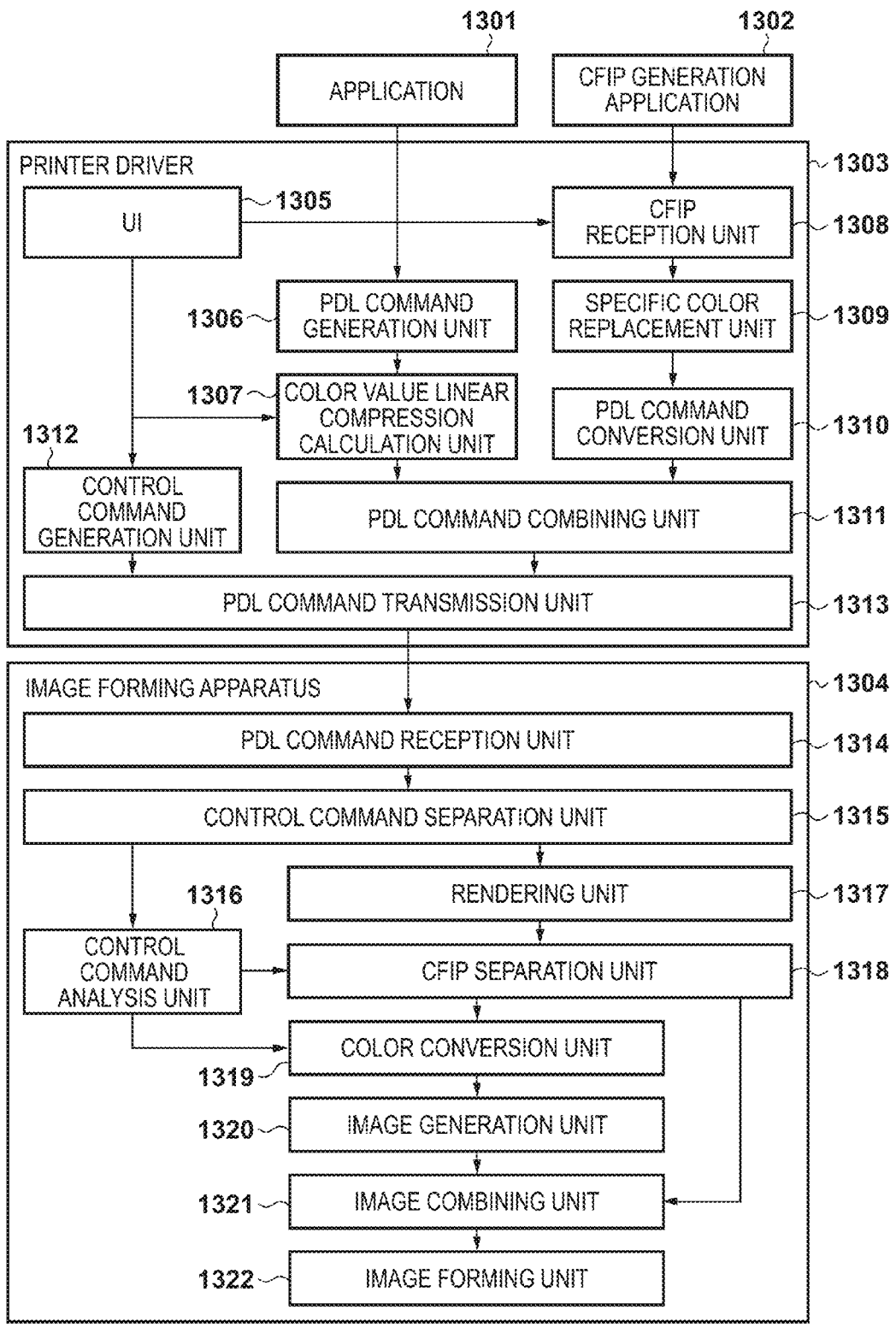
FIG. 13 is a block diagram showing a configuration of an image processing system according to a third embodiment.

FIG. 13 is a block diagram showing a configuration of an image processing system according to the third embodiment.

In this diagram, an application 1301 is a program that creates a document, creates a diagram, and performs image processing and the like on the PC. A CFIP generation application 1302 is a program for generating a CFIP image. Note that the CFIP image is a pattern image configured such that, when a printed matter on which the CFIP image is printed is copied, an image appears which indicates that the copy is not an original printed matter. The printer driver 1303 is a program for converting data generated by the application 1301 into command data (hereinafter referred to as a PDL command) described in a printer description language that is interpretable for an image forming apparatus 1304.

The printer driver 1303 is a program for converting data (input image and CFIP image) generated by the application 1301 and the CFIP generation application 1302 into command data (hereinafter referred to as a PDL command) described in a printer description language that is interpretable for the image forming apparatus 1304.

A user interface (UI) 1305 is an interface with which a user gives a control instruction to the printer driver 1303. A PDL command generation unit 1306 converts a command received from the application 1301 into a PDL command. A CFIP reception unit 1308 receives the CFIP image from the CFIP generation application 1302. A control command generation unit 1312 generates a control command (later-described CFIP addition information) indicating whether or not the CFIP is added to the PDL command.

A specific color replacement unit 1309 replaces the specific color designated for the CFIP image with a specific color value. A PDL command conversion unit 1310 converts the CFIP image and the color value replaced by the specific color replacement unit 1309 into a PDL command. A color value linear compression calculation unit 1307 linearly compresses the color value of the PDL command if the CFIP is added. A PDL command combining unit 1311 combines the PDL commands obtained from the color value linear compression calculation unit 1307 and the PDL command conversion unit 1310. A PDL command transmission unit 1313 transmits the generated PDL command to the image forming apparatus.

Note that the application 1301, the CFIP generation application 1302, and the printer driver 1303 are executed on the PC, for example. The PC has a CPU that executes processing operations including various kinds of calculation, control, discrimination, and the like, a ROM that stores programs and the like, and a RAM that temporarily stores data on which the CPU is performing a processing operation, input data, and the like, for example. The PC reads out various programs such as the application 1301, the CFIP generation application 1302, and the printer driver 1303 from the RAM, and executes them using the CPU.

The image forming apparatus 1304 is an apparatus that receives the PDL command from the printer driver 1303, generates printable data, and executes image formation (printing).

A PDL command reception unit 1314 receives the PDL command from the printer driver 1303. A control command separation unit 1315 separates the control command from the received PDL command. A control command analysis unit 1316 analyzes whether or not addition of the CFIP is designated in the control command separated from the PDL command. If addition of the CFIP is designated, the control command analysis unit 1316 notifies the CFIP separation unit 1318 of an instruction to separate the CFIP, and also sets an LUT, which is a color conversion table associated with specific colors, in a color conversion unit 1319. On the other hand, if addition of the CFIP is not designated, the control command analysis unit 1316 does not notify the CFIP separation unit 1318 of the instruction to separate the CFIP, and sets an LUT for normal colors in the color conversion unit 1319.

A rendering unit 1317 performs rendering of the PDL command and generates a bitmap. If the CFIP separation unit 1318 is notified of the instruction to separate the CFIP from the bitmap received from the rendering unit 1317, the CFIP separation unit 1318 extracts the CFIP and saves it as a CFIP flag, while filling CFIP pixels with peripheral pixel values in the bitmap. If the CFIP separation unit 1318 is not notified of the instruction to separate the CFIP, the CFIP separation unit 1318 does nothing.

The color conversion unit 1319 converts, using the set LUTs, the bitmap received from the CFIP separation unit 1318 from a PDL command color space into a print color space. An image generation unit 1320 converts, into a printable image, the bitmap that has been converted into a print color space.

An image combining unit 1321 converts the CFIP flag into the CFIP, while combining it with the image that has been converted into a printable image, in the case where the CFIP separation unit 1318 has saved the CFIP flag. An image forming unit 1322 executes image formation onto a recording medium such as paper, based on the image generated by the image generation unit 1320 or the image combining unit 1321.

The image forming apparatus 1304 has a CPU that executes processing operations such as image processing and image formation including various kinds of calculation, control, discrimination, and the like, a ROM that stores programs and the like, and a RAM that temporarily stores data on which the CPU is performing a processing operation, input data, and the like, for example. Note that control of later-described color conversion and image formation is realized by the CPU of the image forming apparatus 1304 reading out corresponding control programs from the ROM and executing them.

Description of Color Processing

Figure 18:
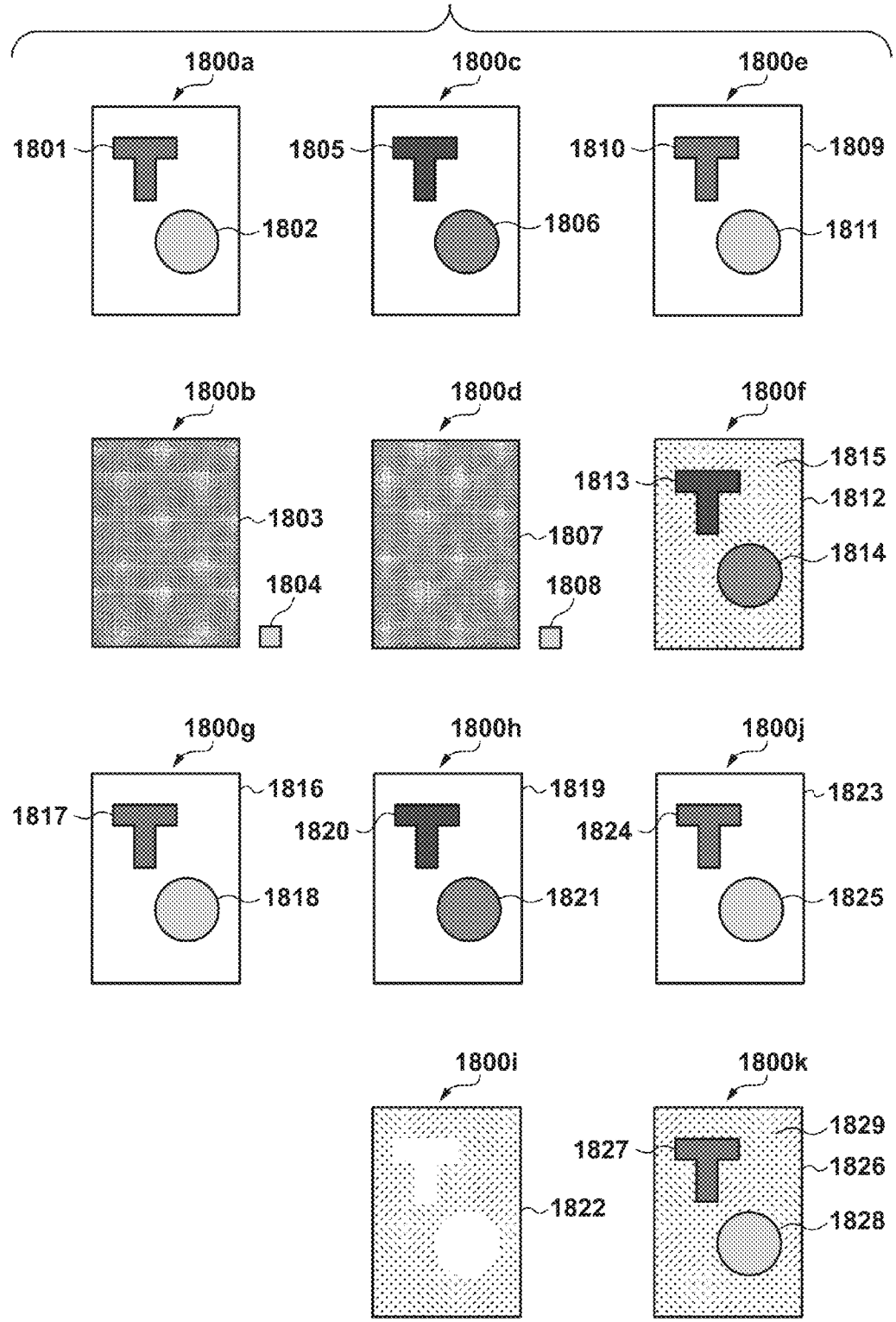
FIG. 18 is a diagram illustratively showing changes of images indicated by data in each step in the third embodiment.

FIG. 18 is a diagram illustratively showing changes of images indicated by data in each step in the third embodiment. Specifically, FIG. 18 shows changes of images indicated by the PDL command processed by the printer driver 1303 and bitmaps processed by the image forming apparatus.

An image 1800*a* is an image indicated by the command generated by the application 1301. An image 1800*b* shows a CFIP 1803 and a designated color 1804 that are indicated by the command generated by the CFIP generation application 1302.

An image 1800*c* is an image indicated by the PDL command obtained after color value linear compression is performed on the command indicating the image 1800*a*, in the case of adding the CFIP. An image 1800*d* shows a CFIP 1807 and a designated color 1808 obtained after the color value of the CFIP of the image 1800*b* is replaced by the specific color replacement unit 1309.

An image 1800*e* is an image indicated by the bitmap generated by the image forming apparatus 1304 based on the command of the image 1800*a*, in the case of not adding the CFIP. An image 1800*f* is an image indicated by the bitmap generated by the image forming apparatus 1304 based on the command of the image 1800*c*, in the case of adding the CFIP.

An image 1800*g* is an image indicated by the bitmap obtained after color conversion is performed on the bitmap of the image 1800*e*, in the case of not adding the CFIP. An image 1800*h* is an image indicated by the bitmap obtained by replacing a CFIP pixel portion in the bitmap of the image 1800*f* with predetermined pixels (here, peripheral pixels). An image 1800*i* is an image indicated by the bitmap indicating a CFIP flag for the bitmap of the image 1800*f*.

An image 1800*j* is an image indicated by the bitmap obtained after color conversion is performed on the bitmap of the image 1800*h*. An image 1800*k* is an image indicated by the bitmap with which the CFIP is combined.

FIG. 17 is a diagram illustratively showing changes of images in the CFIP separation unit 1318 and the image combining unit 1321 in the third embodiment. An image 1700*a* is an image indicating a part of the bitmap generated by the rendering unit 1317, in the case of adding the CFIP. An image 1700*b* is an image indicating the bitmap generated by filling pixels indicating the CFIP in the bitmap of the image 1700*a* with peripheral pixels, by the CFIP separation unit 1318, in the case of adding the CFIP. An image 1700*c* shows a CFIP flag obtained by generating the output of pixel portions indicating the CFIP on the bitmap of the image 1700*a* while selecting a bit combination using the color value, by the CFIP separation unit 1318, in the case of adding the CFIP.

System Operations

Figure 14:
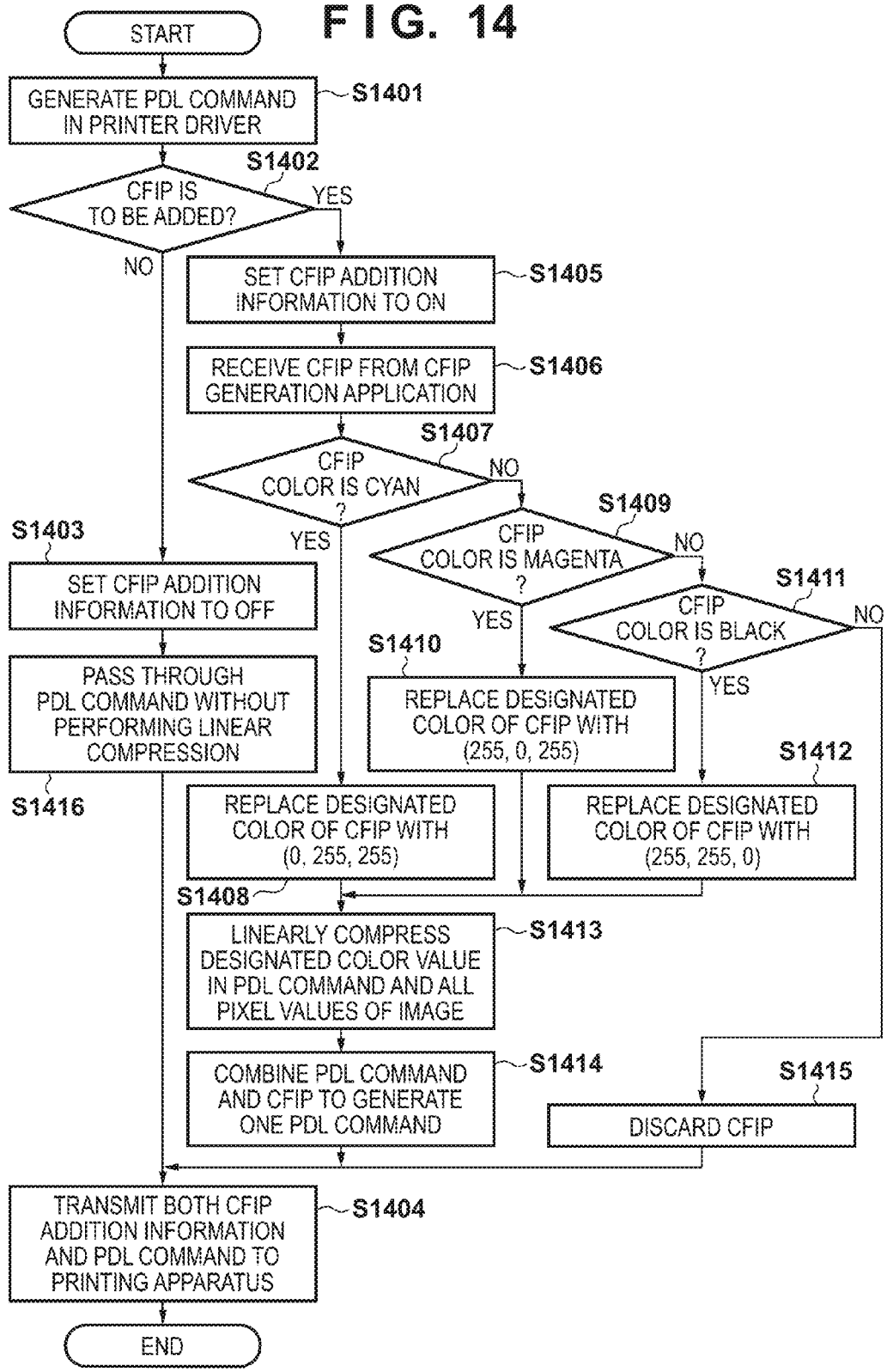
FIG. 14 is a flowchart showing a procedure from generation of a PDL command up to transmission to an image forming apparatus in the third embodiment.

FIG. 14 is a flowchart showing a procedure from generation of the PDL command up to transmission to the image forming apparatus in the third embodiment.

In step S1401, the PDL command generation unit 1306 generates objects 1801 and 1802 from a command received from the application 1301. Here, the designated color of the object 1801 is (R, G, B)=(255, 0, 0), and the designated color of the object 1802 is (R, G, B)=(255, 0, 255).

In step S1402, the UI 1305 of the printer driver 1303 checks whether addition of the CFIP is set, and if addition of the CFIP is not set, the processing proceeds to step S1403. On the other hand, if addition of the CFIP is set, the processing proceeds to step S1405.

In step S1403, the control command generation unit 1312 sets the CFIP addition information to "OFF" to generate a control command. In step S1416, the color value linear compression calculation unit 1307 configures a setting of not performing calculation, and passes through the PDL command as-is. The PDL command combining unit 1313 generates a PDL command for the objects 1801 and 1802, and the processing proceeds to step S1404.

In step S1404, the PDL command transmission unit 1313 transmits the CFIP addition information, which is the control command, and the PDL commands for the objects 1801 and 1802 to the image forming apparatus 1304.

In step S1405, the control command generation unit 1312 sets the CFIP addition information to "ON" to generate a control command. In step S1406, the CFIP reception unit 1308 receives the CFIP image 1803 and the designated color 1804 of the CFIP from the CFIP generation application 1302. In step S1407, the specific color replacement unit 1309 checks the designated color 1804 of the CFIP, and if the designated color is cyan, the processing proceeds to step S1408. On the other hand, if the designated color 1804 of the CFIP is not cyan, the processing proceeds to step S1409.

In step S1408, the specific color replacement unit 1309 replaces the designated color 1804 of the CFIP with (R, G, B)=(0, 255, 255), and the PDL command conversion unit 1310 generates the objects 1807 and 1808.

In step S1409, the specific color replacement unit 1309 checks the designated color 1804 of the CFIP, and if the designated color is magenta, the processing proceeds to step S1410. On the other hand, if the designated color 1804 of the CFIP is not magenta, the processing proceeds to step S1411.

In step S1410, the specific color replacement unit 1309 replaces the designated color 1804 of the CFIP with (R, G, B)=(255, 0, 255), and the PDL command conversion unit 1310 generates the objects 1807 and 1808.

In step S1411, the specific color replacement unit 1309 checks the designated color 1804 of the CFIP, and if the designated color is black, the processing proceeds to step S1412. On the other hand, if the designated color 1804 of the CFIP is not black, the processing proceeds to step S1415. In step S1412, the specific color replacement unit 1309 replaces the designated color 1804 of the CFIP with (R, G, B)=(255, 255, 0), and the PDL command conversion unit 1310 generates the objects 1807 and 1808.

In step S1413, the color value linear compression calculation unit 1307 linearly compresses designated color values of the objects 1801 and 1802. Here, the designated color values are multiplied by (6−2)/(6−1)=4/5 to regenerate objects 1805 and 1806. Here, the designated color of the object 1805 is (R, G, B)=(255×4/5, 0×4/5, 0×4/5)=(204, 0, 0). The designated color of the object 1806 is (R, G, B)=(255×4/5, 0×4/5, 255×4/5)=(204, 0, 204).

In step S1414, the PDL command combining unit 1311 combines the objects 1805, 1806, 1807, and 1808 to regenerate a PDL command, and the processing proceeds to step S1404. On the other hand, in step S1415, the CFIP image 1803 and the designated color 1804 of the CFIP are discarded, the processing of the PDL command combining unit 1311 is passed through, and the processing proceeds to step S1404.

In step S1404, the PDL command transmission unit 1313 transmits the regenerated PDL command to the image forming apparatus 1304. Here, the PDL command contains the CFIP addition information, which is the control command, and the objects 1805, 1806, 1807, and 1808.

Figure 15:
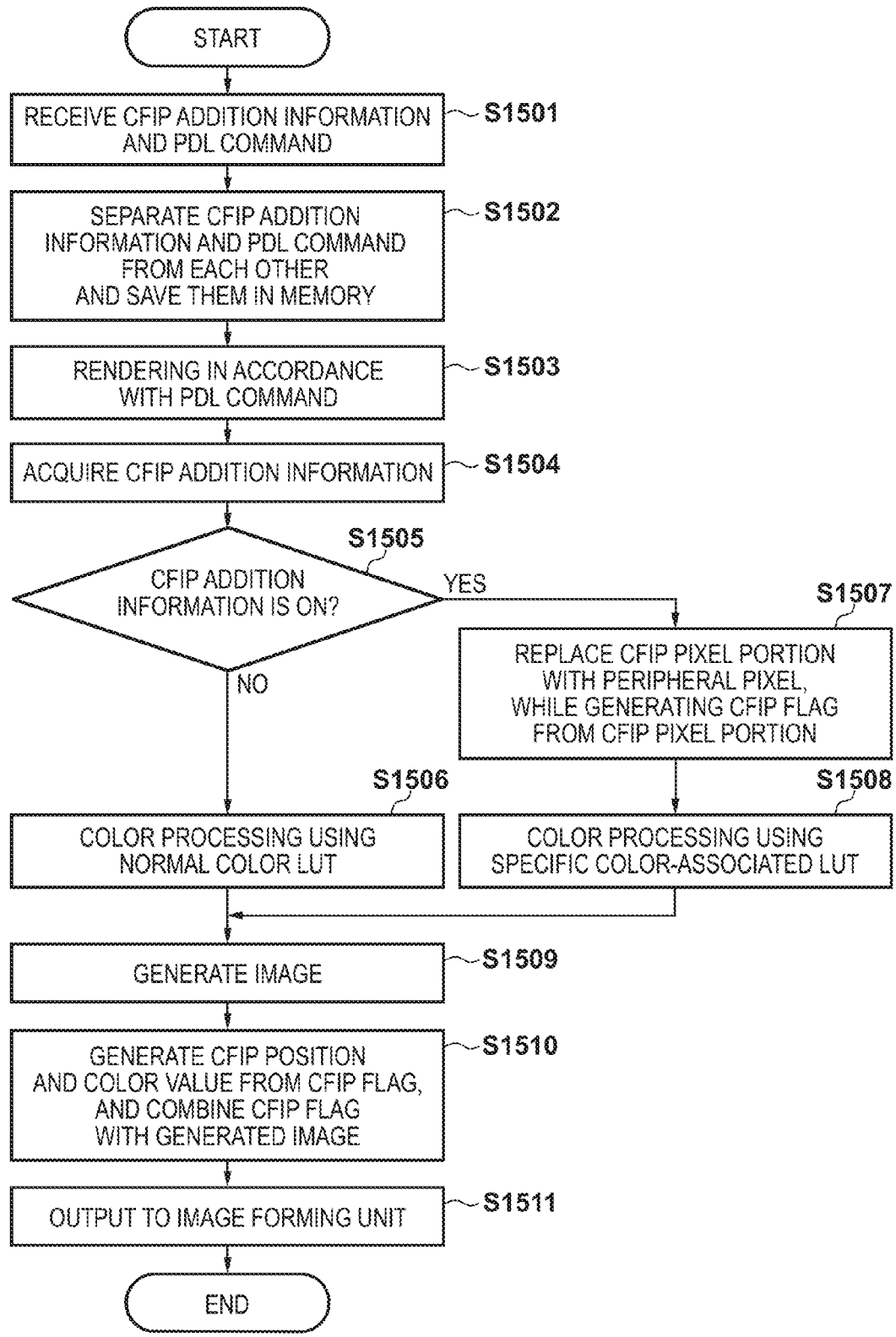
FIG. 15 is a flowchart showing a procedure from reception of the PDL command up to image formation in the third embodiment.
Figure 16A:
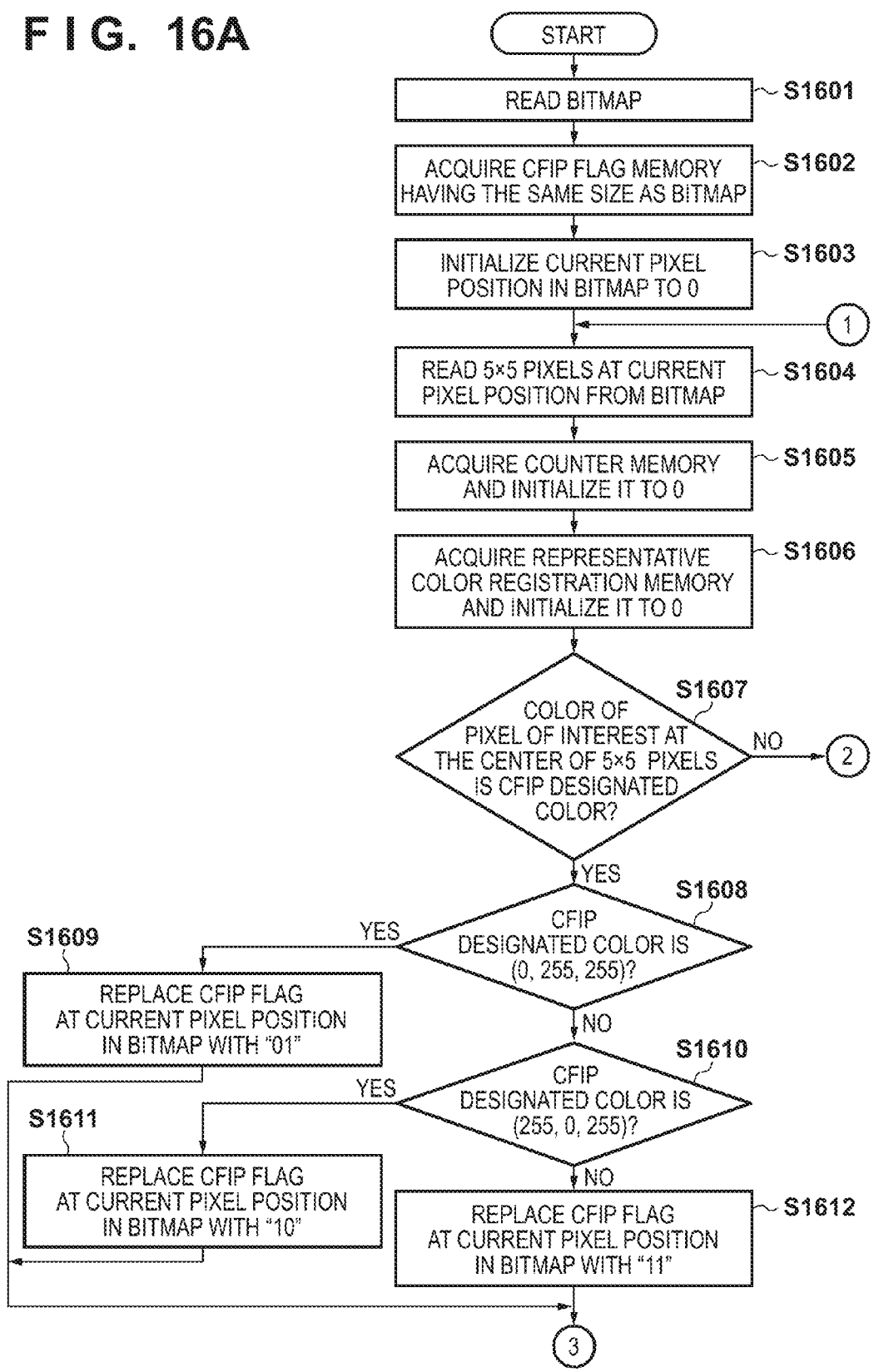
FIGS. 16A to 16E are flowcharts showing an operation procedure of a copy-forgery-inhibited pattern (CFIP) separation unit.
Figure 16B:
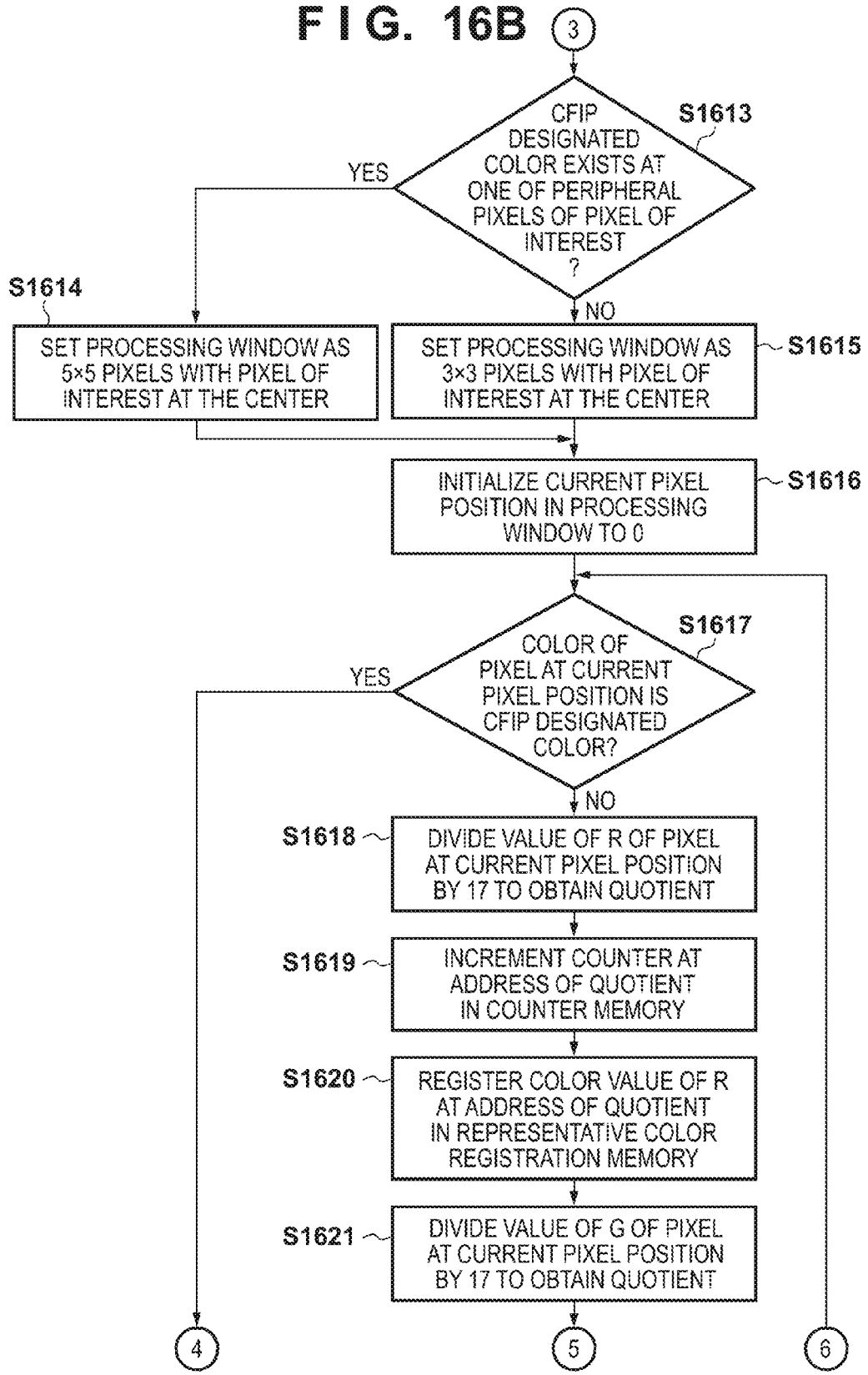
Figure 16C:
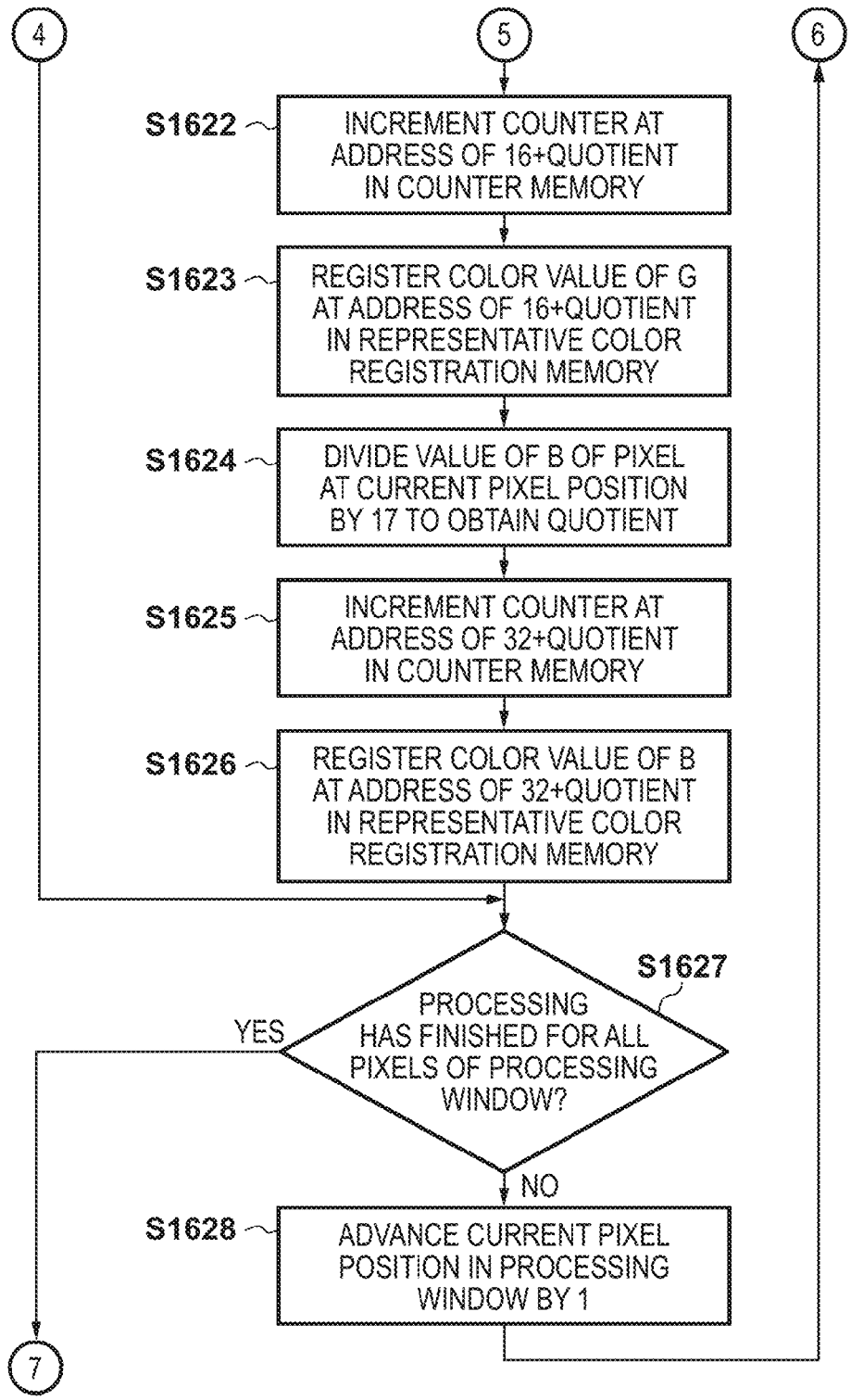
Figure 16D:
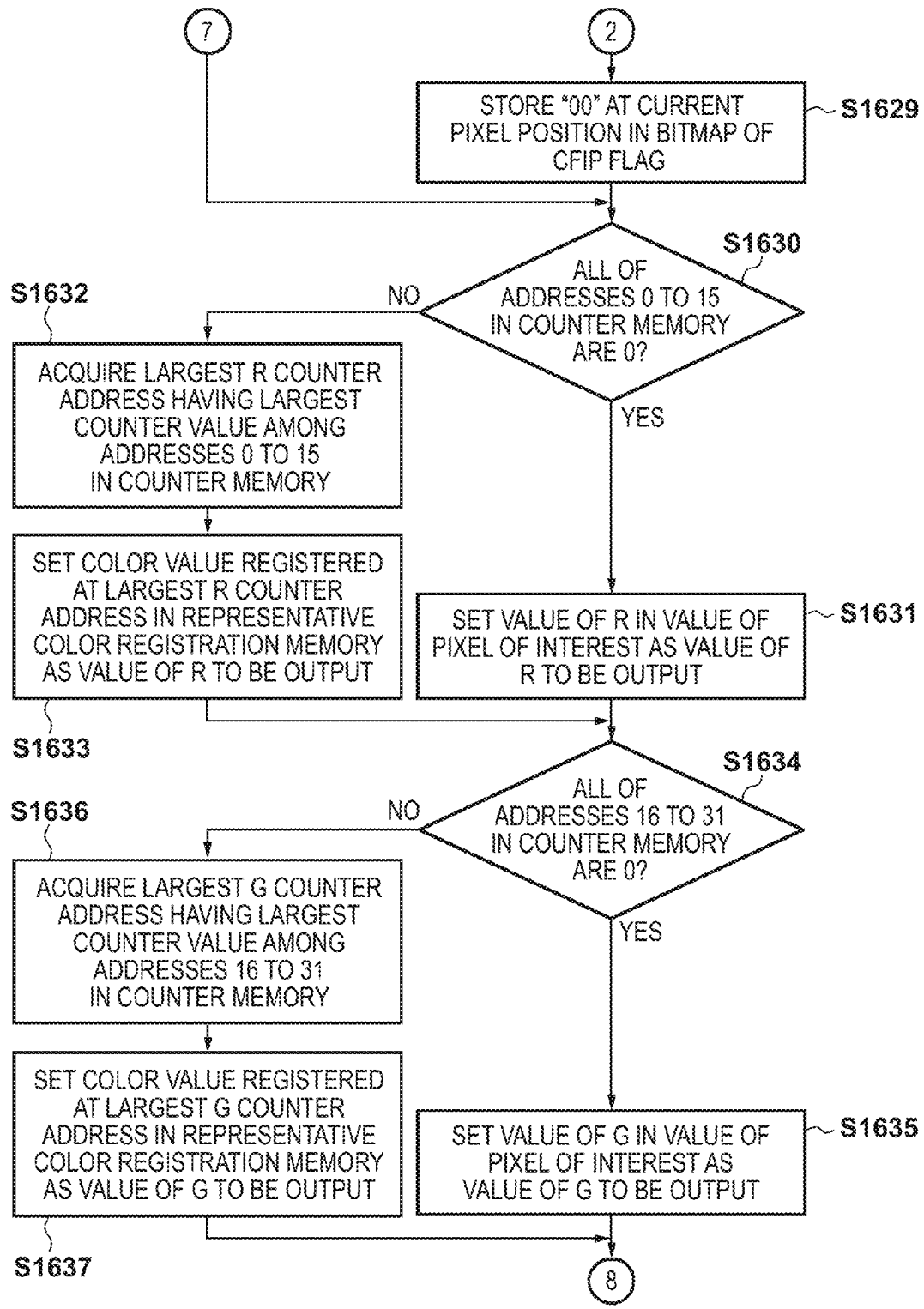
Figure 16E:
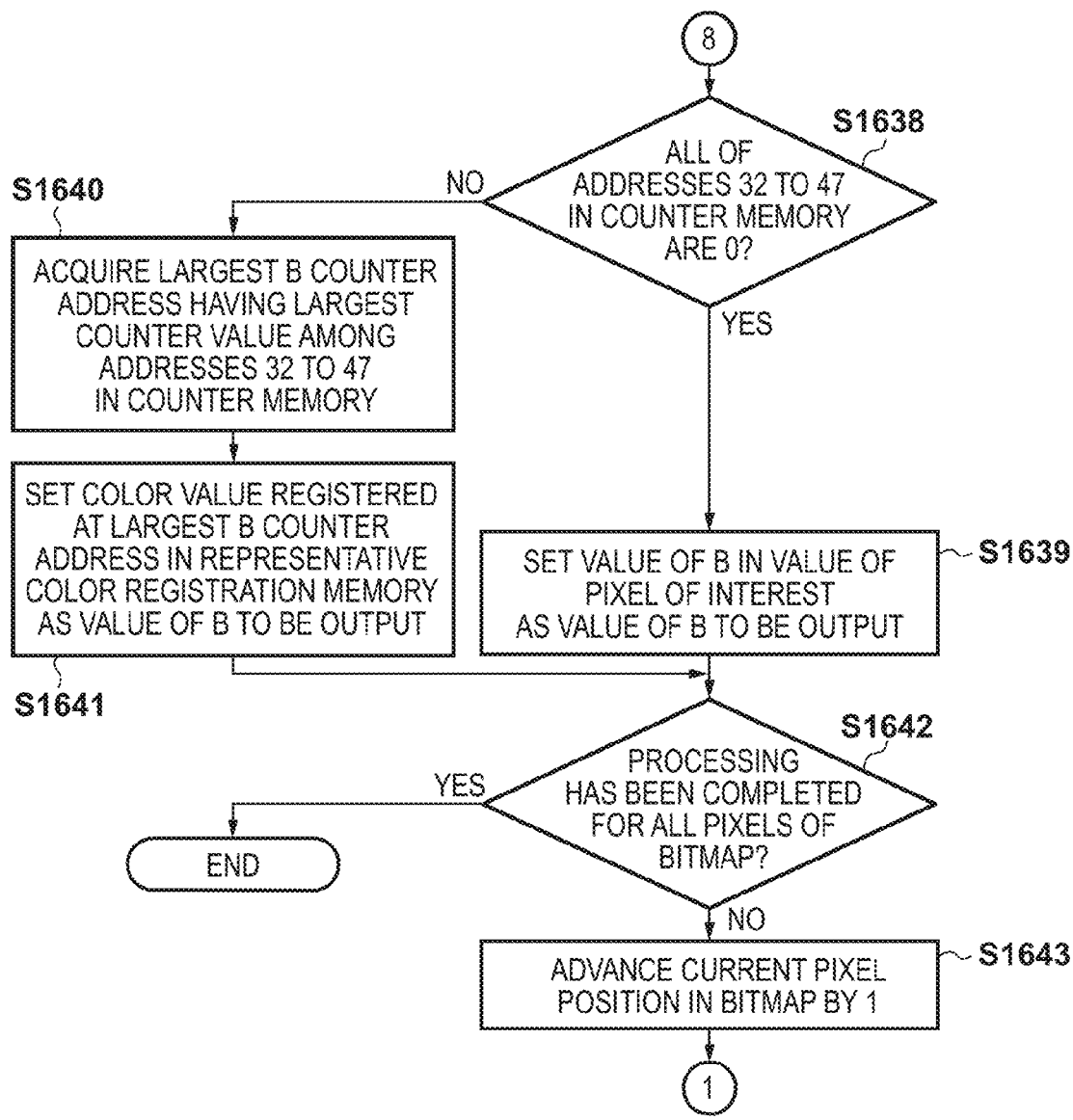

FIG. 15 is a flowchart showing a procedure from reception of the PDL command up to image formation in the third embodiment. That is to say, it is a flowchart showing a procedure performed in the image forming apparatus 1304 after the flow described in FIG. 14 is performed.

In step S1501, the PDL command reception unit 1314 in the image forming apparatus 1304 receives the PDL command transmitted from the printer driver 1303. In step S1502, the control command separation unit 1315 separates the control command from the PDL command.

In step S1503, the rendering unit 1317 renders the objects 1801 and 1802 or the objects 1805, 1806, 1807, and 1808 that are contained in the PDL command, and generates a bitmap 1809 or a bitmap 1812.

In step S1504, the control command analysis unit 1316 acquires the CFIP addition information. In step S1505, the control command analysis unit 1316 checks whether the CFIP addition information is "ON", and if it is "OFF" (i.e., not "ON"), the processing proceeds to step S1506. On the other hand, if the CFIP addition information is "ON", the processing proceeds to step S1507.

In step S1506, the color conversion unit 1319 performs color processing on the bitmap 1809 using the normal color LUT 201, and generates a bitmap 1816. Here, for the color value (R, G, B)=(255, 0, 0) of an object 1810 on the bitmap 1809, the grid point 205 on the coordinates (R, G, B)=(5, 0, 0) in the normal color LUT 201 is referenced. Accordingly, the color value of an object 1817 on the bitmap 1816 is (C, M, Y, K)=(0, 200, 200, 0).

Also, for the color value (R, G, B)=(255, 0, 255) of an object 1811 on the bitmap 1809, the grid point 204 on the coordinates (R, G, B)=(0, 5, 5) in the normal color LUT 201 is referenced. Accordingly, the color value of an object 1818 on the bitmap 1816 is (C, M, Y, K)=(176, 0, 0, 0).

In step S1507, the CFIP separation unit 1318 generates a bitmap 1819 by replacing a CFIP pixel portion of the bitmap 1812 with peripheral pixels, while generating a CFIP flag 1822 from the bitmap 1812. Here, the color value of an object 1820 on the bitmap 1819 remains (R, G, B)=(204, 0, 0), and the color value of an object 1821 remains (R, G, B)=(204, 0, 204). The CFIP flag 1822 is two-bit data, and if the designated color of the CFIP is (R, G, B)=(0, 255, 255), the pixels of the CFIP are "1", and the other pixels are "0".

In step S1508, the color conversion unit 1319 performs color conversion on the bitmap 1819 using the specific color-associated LUT 203, and generates a bitmap 1823. Here, for the color value (R, G, B)=(204, 0, 0) of the object 1820 on the bitmap 1819, the grid point 213 on the coordinates (R, G, B)=(4, 0, 0) in the specific color-associated LUT 203 is referenced. Accordingly, the color value of an object 1824 on the bitmap 1823 is (C, M, Y, K)=(0, 200, 200, 0). Also, for the color value (R, G, B)=(204, 0, 204) of the object 1821 on the bitmap 1819, the grid point 212 on the coordinates (R, G, B)=(0, 4, 4) in the specific color-associated LUT 203 is referenced. Accordingly, the color value of an object 1825 on the bitmap 1823 is (C, M, Y, K)=(176, 0, 0, 0).

In step S1509, the image generation unit 1320 converts the bitmap obtained after being subjected to color processing into a bitmap in a printable format.

In step S1510, in the case where the CFIP separation unit 1318 has separated the CFIP, the image combining unit 1321 converts the CFIP flag 1822 into a bitmap, while combining this bitmap with the bitmap generated in step S1509 to generate a bitmap 1826, and ends this step. Here, since the CFIP flag 1822 is constituted by "0" and "1", the portions of "1" are replaced with (C, M, Y, K)=(255, 0, 0, 0) to perform combination. In the case where the CFIP has not been separated by the CFIP separation unit 1318, the CFIP flag is constituted only by "0", and accordingly nothing changes even if the CFIP flag is combined with the bitmap 1816.

In step S1511, the image forming unit 1322 executes image formation onto a recording medium such as paper, based on the generated bitmap 1826.

FIGS. 16A to 16E are flowcharts showing a procedure through which the CFIP separation unit 1318 generates the CFIP flag from a bitmap, while filling pixels of the CFIP with peripheral pixels.

In step S1601, the CFIP separation unit 1318 reads a bitmap 1701 generated by the rendering unit 1318. In step S1602, the CFIP separation unit 1318 acquires a memory having the same size as the bitmap 1701, for storing the CFIP flag, each pixel of which is constituted by two bits ("00" to "11" in binary representation, and "0x0" to "0x3" in hexadecimal representation). In step S1603, the CFIP separation unit 1318 initializes the current pixel position in the bitmap 1701 to "0".

In step S1604, the CFIP separation unit 1318 reads 5×5 pixels, the center of which is the current pixel position, from the bitmap 1701. Here, if a portion of the 5×5 pixels is out of the bitmap 1701, this portion may be made up by assuming that the color value at this portion is (R, G, B)=(255, 255, 255). In step S1605, the CFIP separation unit 1318 acquires a memory to be used as a counter, and initializes it to "0". In step S1606, the CFIP separation unit 1318 acquires a memory for registering a representative color, and initializes it to "0".

In step S1607, the CFIP separation unit 1318 determines whether the color of a pixel of interest located at the center of the 5×5 pixels is a CFIP designated color. Here, the CFIP designated color is one of (R, G, B)=(0, 255, 255), (R, G, B)=(255, 0, 255), and (R, G, B)=(255, 255, 0). If the color of the pixel of interest is the CFIP designated color, the processing proceeds to step S1608. On the other hand, if the color of the pixel of interest is not the CFIP designated color, the processing proceeds to step S1629.

In step S1608, the CFIP separation unit 1318 determines whether the color of the pixel of interest is the CFIP designated color (R, G, B)=(0, 255, 255), and if it is (R, G, B)=(0, 255, 255), the processing proceeds to step S1609. On the other hand, if the color of the pixel of interest is not the CFIP designated color (R, G, B)=(0, 255, 255), the processing proceeds to step S1610.

In step S1609, the CFIP separation unit 1318 stores "0x1" ("01" in binary) at the current pixel position in the bitmap of the CFIP flag.

In step S1610, the CFIP separation unit 1318 determines whether the color of the pixel of interest is the CFIP designated color (R, G, B)=(255, 0, 255), and if it is (R, G, B)=(255, 0, 255), the processing proceeds to step S1611. On the other hand, if the color of the pixel of interest is not the CFIP designated color (R, G, B)=(255, 0, 255), the processing proceeds to step S1612.

In step S1611, the CFIP separation unit 1318 stores "0x2" ("10" in binary) at the current pixel position in the bitmap of the CFIP flag. Here, the bitmap 1701 includes a pixel 1703 having the CFIP designated color (R, G, B)=(255, 0, 255), and when the processing has finished for all pixels in the bitmap 1701, the CFIP flag 1706 is completed. A pixel 1707 included in the CFIP flag 1706 is "0x2".

In step S1612, the CFIP separation unit 1318 stores "0x3" ("11" in binary) at the current pixel position in the bitmap of the CFIP flag.

In step S1613, the CFIP separation unit 1318 checks whether the CFIP designated color exists among the peripheral pixels that are adjacent to the pixel of interest, and if it exists, the processing proceeds to step S1614. On the other hand, if it does not exist, the processing proceeds to step S1615.

In step S1614, the CFIP separation unit 1318 sets a window on which processing is to be performed as an area of 5×5 pixels with the pixel of interest at the center. In step S1615, the CFIP separation unit 1318 sets the window on which processing is to be performed as an area of 3×3 pixels with the pixel of interest at the center.

In step S1616, the CFIP separation unit 1318 initializes the current pixel position in the processing window to "0".

In step S1617, the CFIP separation unit 1318 checks whether the color of the pixel at the current pixel position is the CFIP designated color, and if it is the CFIP designated color, the processing proceeds to step S1627. On the other hand, if the color of the pixel at the current pixel position is not the CFIP designated color, the processing proceeds to step S1618.

In step S1618, the CFIP separation unit 1318 divides the value of R of the pixel at the current pixel position by 17 to obtain a quotient. Here, in the case where a pixel 1702 in the bitmap 1701 is (R, G, B)=(56, 98, 238), the quotient of 56/17 is "3". In step S1619, the CFIP separation unit 1318 increments (i.e., increases by 1) the counter at the address of the quotient in the counter memory. Here, since the quotient is "3", the counter at the address 3 is incremented. In step S1620, the CFIP separation unit 1318 registers the color value of R at the address of the quotient in the representative color registration memory. Here, since the quotient is "3", the color value "56" of R is registered at the address 3 in the representative color registration memory.

In step S1621, the CFIP separation unit 1318 divides the value of G of the pixel at the current pixel position by 17 to obtain a quotient. Here, in the case where the pixel 1702 in the bitmap 1701 is (R, G, B)=(56, 98, 238), the quotient of 98/17 is "5". In step S1622, the CFIP separation unit 1318 increments the counter at the address of 16+the quotient in the counter memory. Here, since the quotient is "5", the counter at the address 16+5=21 is incremented. In step S1623, the CFIP separation unit 1318 registers the color value of G at the address of 16+the quotient in the representative color registration memory. Here, since the quotient is "5", the color value "98" of G is registered at the address 16+5=21 in the representative color registration memory.

In step S1624, the CFIP separation unit 1318 divides the value of B of the pixel at the current pixel position by 17 to obtain a quotient. Here, in the case where the pixel 1702 in the bitmap 1701 is (R, G, B)=(56, 98, 238), the quotient of 238/17 is "14". In step S1625, the CFIP separation unit 1318 increments the counter at the address of 32+the quotient in the counter memory. Here, since the quotient is "14", the counter at the address 32+14=46 is incremented. In step S1626, the CFIP separation unit 1318 registers the color value of B at the address of 32+the quotient in the representative color registration memory. Here, since the quotient is "14", the color value "238" of B is registered at the address 32+14=46 in the representative color registration memory.

In step S1627, the CFIP separation unit 1318 checks whether the processing has finished for all pixels in the processing window, and if not, the processing proceeds to step S1628. On the other hand, if the processing has finished for all pixels, the processing proceeds to step S1630. In step S1628, the CFIP separation unit 1318 advances the current pixel position in the processing window by 1, the processing then proceeds to step S1617, and the above processing is repeated.

In step S1629, the CFIP separation unit 1318 stores "0x0" at the current pixel position in the bitmap of the CFIP flag.

In step S1630, the CFIP separation unit 1318 checks whether or not all of the addresses 0 to 15 in the counter memory are "0", the processing proceeds to step S1631 if all of the addresses are "0", and the processing proceeds to step S1632 if there is an address that is not "0". In step S1631, the CFIP separation unit 1318 sets the value of R in the color value of the pixel of interest as the value of R to be output.

In step S1632, the CFIP separation unit 1318 acquires an address having the largest counter value among the addresses 0 to 15 in the counter memory. In step S1633, the CFIP separation unit 1318 sets, as the value of R to be output, the color value registered at the address obtained in step S1632 in the representative color registration memory. Here, in the case of a window including the pixel 1702 in the bitmap 1701, the value of R to be output is "56".

In step S1634, the CFIP separation unit 1318 checks whether or not all of the addresses 16 to 31 in the counter memory are "0", the processing proceeds to step S1635 if all of the addresses are "0", and the processing proceeds to step S1636 if there is an address that is not "0". In step S1635, the CFIP separation unit 1318 sets the value of G in the color value of the pixel of interest as the value of G to be output.

In step S1636, the CFIP separation unit 1318 acquires an address having the largest counter value among the addresses 16 to 31 in the counter memory. In step S1637, the CFIP separation unit 1318 sets, as the value of G to be output, the color value registered at the address obtained in step S1636 in the representative color registration memory. Here, in the case of a window including the pixel 1702 in the bitmap 1701, the value of G to be output is "98".

In step S1638, the CFIP separation unit 1318 checks whether or not all of the addresses 32 to 47 in the counter memory are "0", the processing proceeds to step S1639 if all of the addresses are "0", and the processing proceeds to step S1640 if there is an address that is not "0". In step S1639, the CFIP separation unit 1318 sets the value of B in the color value of the pixel of interest as the value of B to be output.

In step S1640, the CFIP separation unit 1318 acquires an address having the largest counter value among the addresses 32 to 47 in the counter memory. In step S1641, the CFIP separation unit 1318 sets, as the value of B to be output, the color value registered at the address obtained in step S1640 in the representative color registration memory. Here, in the case of a window including the pixel 1702 in the bitmap 1701, the value of B to be output is "238".

In step S1642, the CFIP separation unit 1318 checks whether the processing has been completed for all pixels in the bitmap, and if not, the processing proceeds to step S1643. On the other hand, if the processing has finished for all pixels, the processing ends. Here, when the processing has finished for all pixels, an output bitmap 1704 including a pixel 1705 that is (R, G, B)=(56, 98, 238), and the CFIP flag 1706 including the pixel 1707 "0x2" are completed.

In step S1643, the CFIP separation unit 1318 advances the current pixel position in the bitmap by 1, the processing returns to step S1604, and the above processing is repeated.

As described above, according to the third embodiment, the CFIP can be printed out more preferably by designating the color to be used in the CFIP as the specific color and combining the CFIP after separating the CFIP and applying other processing. Specifically, new image processing can be added before dithering processing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-043152, filed Mar. 5, 2014 and No.

2014-160803, filed Aug. 6, 2014, which are hereby incorporated by reference herein in their entirety.

What is claimed is:

1. An image processing apparatus having a color conversion unit configured to perform color conversion using a look-up table (LUT) for defining conversion from an input color to an output color, the apparatus comprising:
   an input unit configured to input an image that is to be a target of color conversion;
   an accepting unit configured to accept designation of a specific color; and
   a generation unit configured to register an output value corresponding to the specific color at an unused grid point in the LUT, and generate a specific color-associated LUT,
   wherein the LUT is a three-dimensional LUT in which N grid points are arranged in each axial direction,
   the generation unit secures M unused grid points in each axial direction by rearranging a conversion table such that a three-dimensional space which exists within the LUT and in which (N-M) grid points are arranged in each axial direction shows an entire color space shown by the LUT, and reducing the number of grid points to be used, and
   if the specific color is used in an image input by the input unit, the color conversion unit performs color conversion using the specific color-associated LUT generated by the generation unit.

2. The image processing apparatus according to claim 1, wherein, if an unused grid point does not exist in the LUT, the generation unit secures an unused grid point by rearranging a conversion table such that a partial space of the LUT shows an entire color space shown by the LUT, and reducing the number of grid points to be used.

3. The image processing apparatus according to claim 1, further comprising:
   a color value compression unit configured to perform, on an image in which the specific color is used, linear compression with which a color value of a color other than the specific color is multiplied by $(N-M-1)/(N-1)$; and
   a color value replacement unit configured to replace, with respect to an image in which the specific color is used, a color value of the specific color with a color value that is to serve as a specific output value.

4. The image processing apparatus according to claim 1, further comprising an image forming unit configured to form an image on a recording medium, based on an image on which color conversion has been performed by the color conversion unit.

5. An image processing system including an information processing apparatus and an image processing apparatus having a color conversion unit configured to perform color conversion using a look-up table (LUT) for defining conversion from an input color to an output color,
   the information processing apparatus comprising:
   an input unit configured to input an image that is to be a target of color conversion; and
   an accepting unit configured to accept designation of a specific color,
   the image processing apparatus comprising:
   a generation unit configured to register an output value corresponding to the specific color at an unused grid point in the LUT and generate a specific color-associated LUT,
   wherein the LUT is a three-dimensional LUT in which N grid points are arranged in each axial direction,
   the generation unit secures M unused grid points in each axial direction by rearranging a conversion table such that a three-dimensional space which exists within the LUT and in which (N-M) grid points are arranged in each axial direction shows an entire color space shown by the LUT, and reducing the number of grid points to be used, and
   if the specific color is used in an image input by the input unit, the color conversion unit performs color conversion using the specific color-associated LUT generated by the generation unit.

6. A method for controlling an image processing apparatus having a color conversion unit configured to perform color conversion using a look-up table (LUT) for defining conversion from an input color to an output color, the method comprising:
   inputting an image that is to be a target of color conversion;
   accepting designation of a specific color; and
   registering an output value corresponding to the specific color at an unused grid point in the LUT, and generating a specific color-associated LUT,
   wherein the LUT is a three-dimensional LUT in which N grid points are arranged in each axial direction,
   the specific color-associated LUT is generated by securing M unused grid points in each axial direction by rearranging a conversion table such that a three-dimensional space which exists within the LUT and in which (N-M) grid points are arranged in each axial direction shows an entire color space shown by the LUT, and reducing the number of grid points to be used, and
   if the specific color is used in an image input in the inputting, the color conversion unit performs color conversion using the specific color-associated LUT generated in the generating.

7. A non-transitory computer-readable recording medium storing a program that causes a computer to function as an image processing apparatus having a color conversion unit configured to perform color conversion using a look-up table (LUT) for defining conversion from an input color to an output color, the apparatus comprising:
   an input unit configured to input an image that is to be a target of color conversion;
   an accepting unit configured to accept designation of a specific color; and
   a generation unit configured to register an output value corresponding to the specific color at an unused grid point in the LUT, and generate a specific color-associated LUT,
   wherein the LUT is a three-dimensional LUT in which N grid points are arranged in each axial direction,
   the generation unit secures M unused grid points in each axial direction by rearranging a conversion table such that a three-dimensional space which exists within the LUT and in which (N-M) grid points are arranged in each axial direction shows an entire color space shown by the LUT, and reducing the number of grid points to be used, and
   if the specific color is used in an image input by the input unit, the color conversion unit performs color conversion using the specific color-associated LUT generated by the generation unit.

* * * * *